US008965692B2

(12) United States Patent
Chang et al.

(10) Patent No.: US 8,965,692 B2
(45) Date of Patent: Feb. 24, 2015

(54) FOLLOW ME NAVIGATION SYSTEM

(75) Inventors: Patricia Ruey-Jane Chang, San Ramon, CA (US); Sagiv Draznin, Walnut Creek, CA (US); Lalit R. Kotecha, San Ramon, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 229 days.

(21) Appl. No.: 13/423,765

(22) Filed: Mar. 19, 2012

(65) Prior Publication Data

US 2013/0245939 A1 Sep. 19, 2013

(51) Int. Cl.
*G01C 21/26* (2006.01)

(52) U.S. Cl.
CPC ........................................ *G01C 21/26* (2013.01)
USPC ........................... 701/517; 701/484; 701/485

(58) Field of Classification Search
CPC ........................................................ G01C 21/26
USPC ........................................... 701/517, 484, 485
See application file for complete search history.

(56) References Cited

U.S. PATENT DOCUMENTS

2005/0221876 A1* 10/2005 Van Bosch et al. ......... 455/575.9
2012/0239584 A1* 9/2012 Yariv et al. .................... 705/319
2013/0096819 A1* 4/2013 Tarnok ......................... 701/428

OTHER PUBLICATIONS

Cal Poly Admissions, California Polytechnic State University, "Self-Guided Tours," http://admissions.calpoly.edu/prospective/selfguided, 3 pages, printed on Feb. 1, 2012.

* cited by examiner

*Primary Examiner* — Calvin Cheung
*Assistant Examiner* — Basil T Jos

(57) ABSTRACT

A first navigation device records first direction information as the first navigation device traverses a route from a first location to a second location, and transmits the first direction information to a second navigation device while the second navigation device is following the first navigation along the route. After recording the first direction information and while transmitting the first direction information, the first navigation device records second direction information as the first navigation device traverses the route from the second location to a third location. The first navigation device transmits the second direction information to the second navigation device. The first direction information and the second direction information include information that allows the second navigation device to follow the route traversed by the first navigation device.

20 Claims, 27 Drawing Sheets

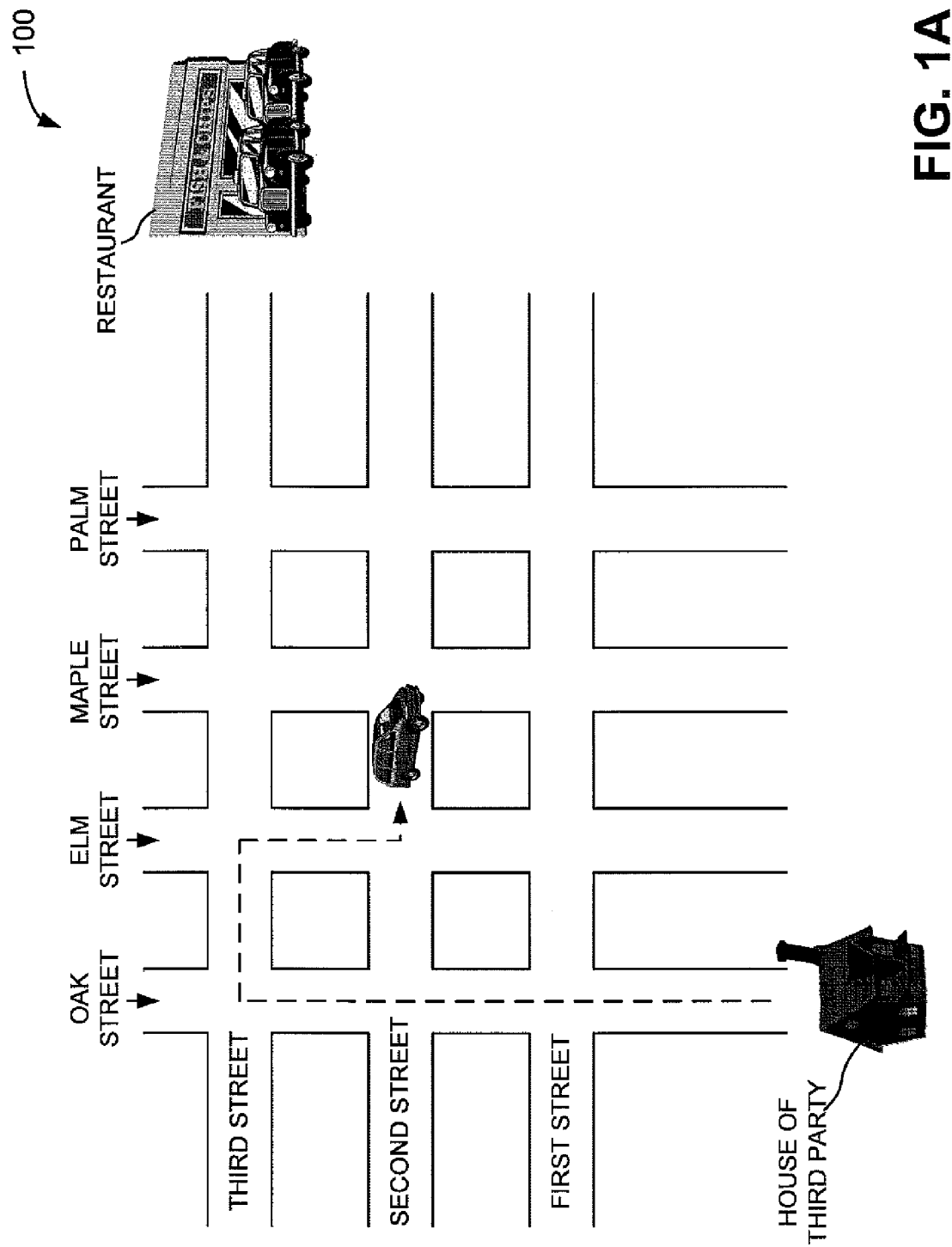

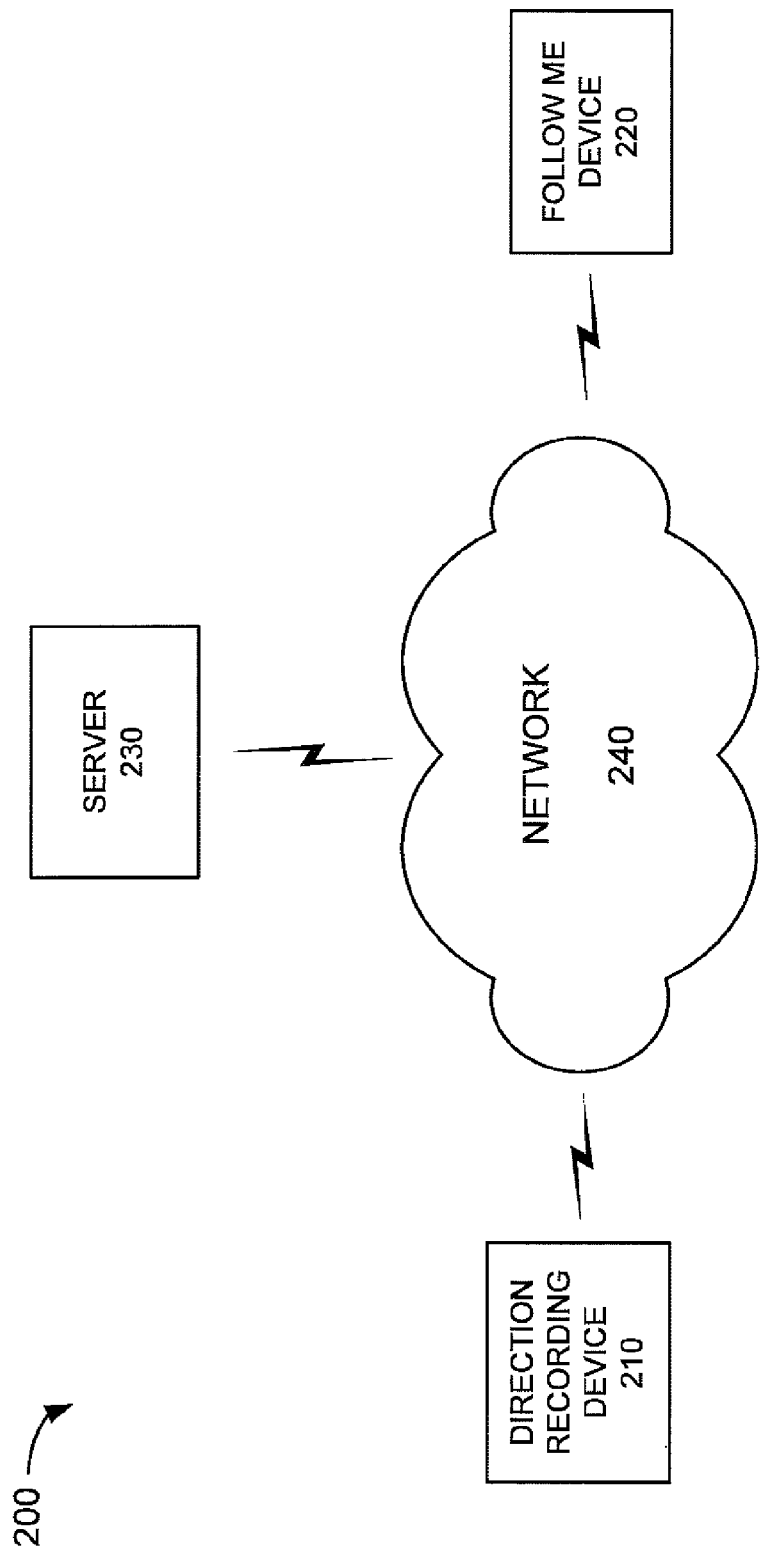

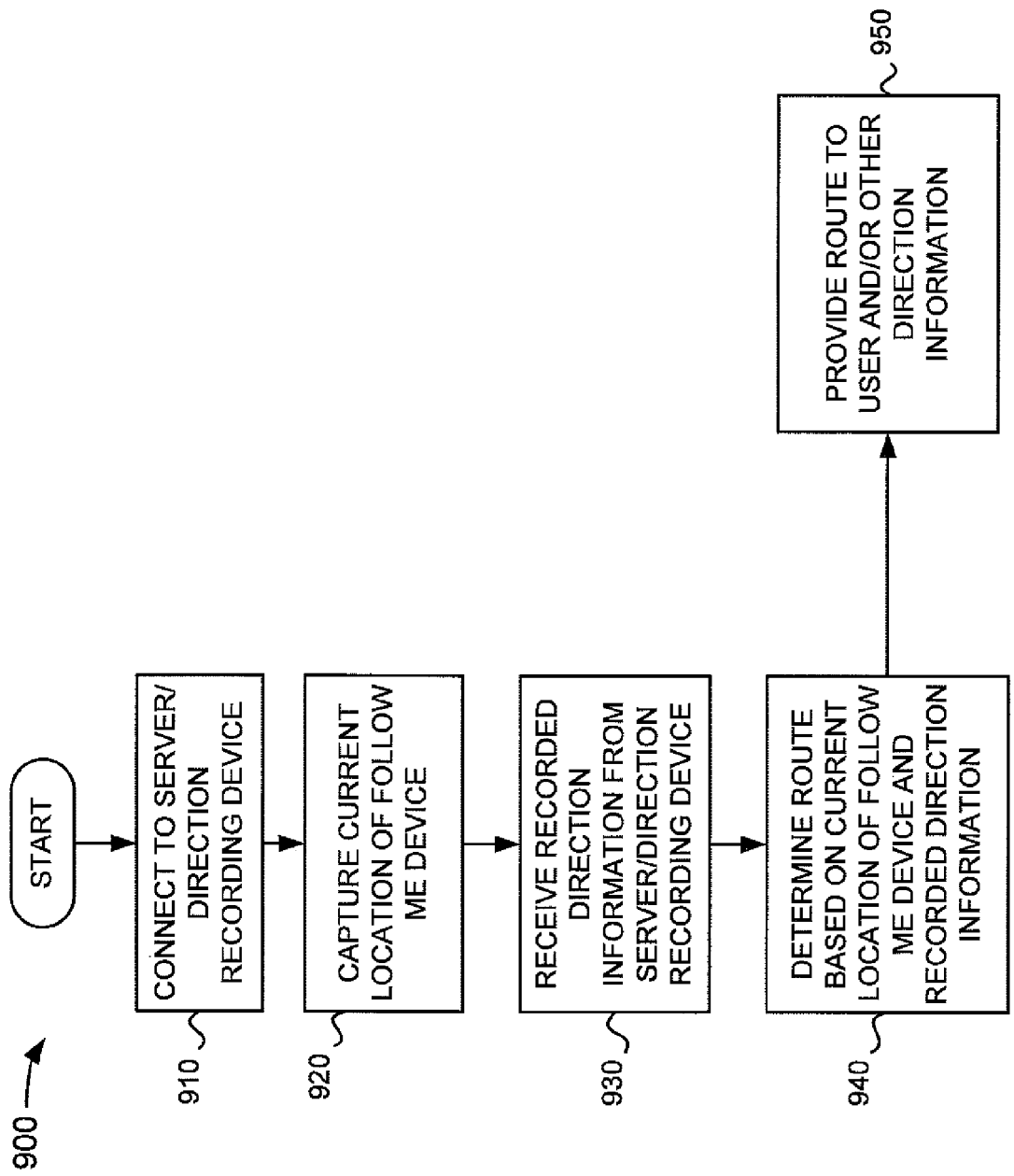

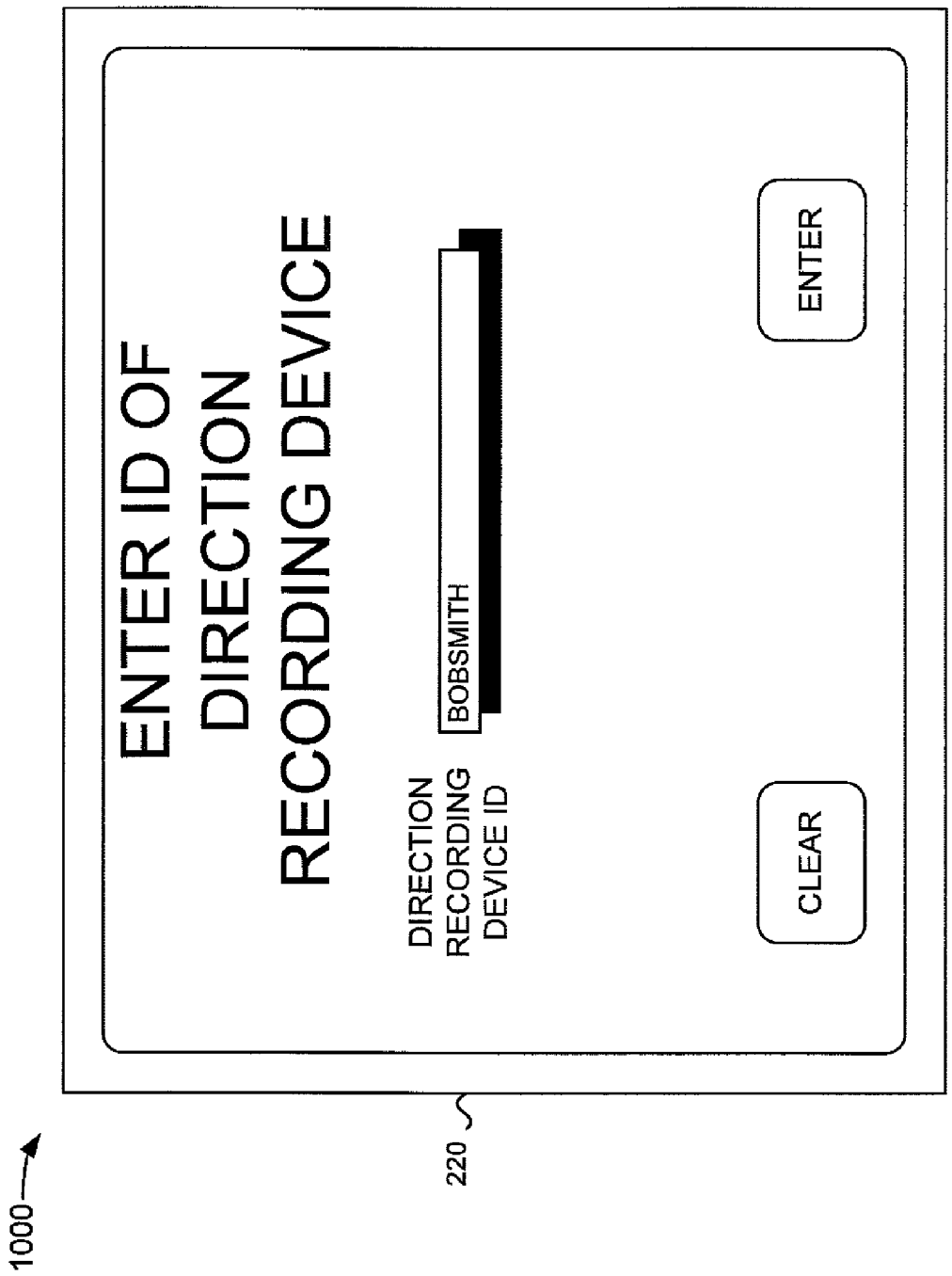

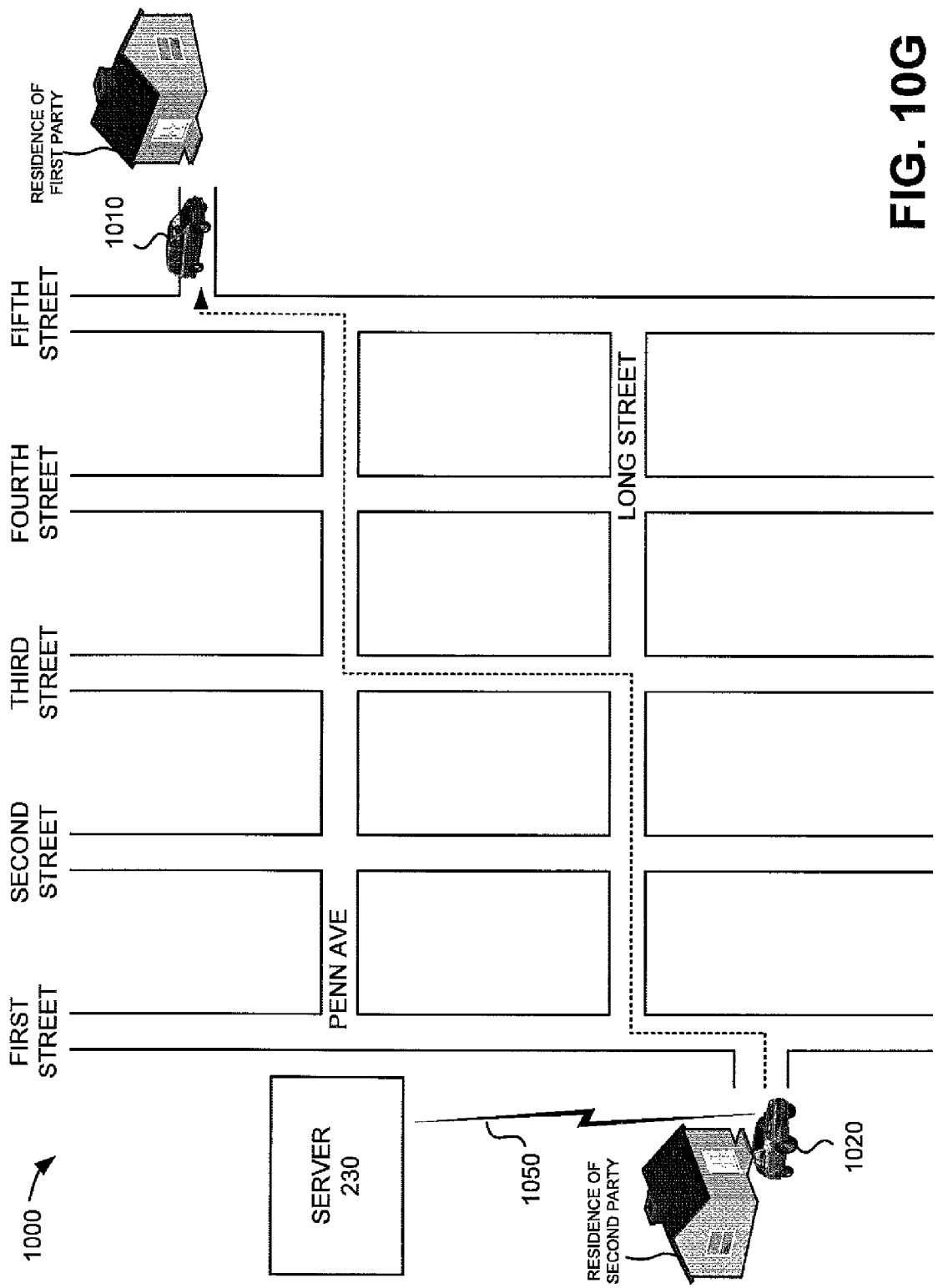

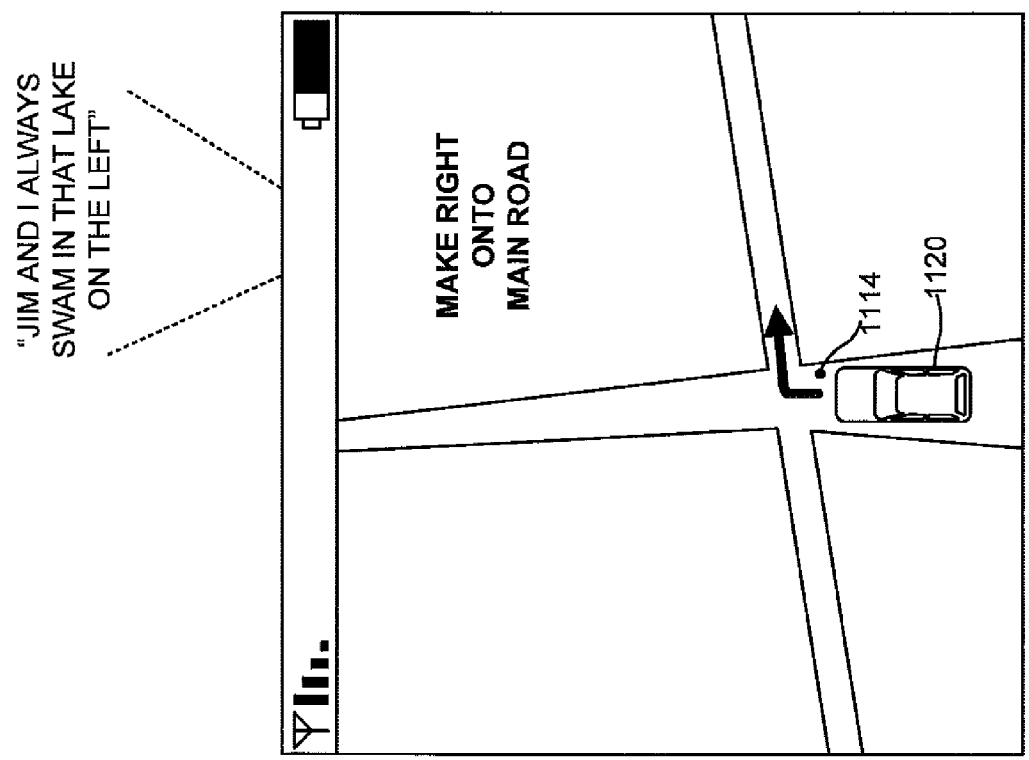

FOLLOW ME NAVIGATION SYSTEM

BACKGROUND

People familiar with a particular geographic area often have knowledge of back roads or alternate roads that can be taken when major roadways are congested. In some situations, these people can verbally provide directions, provide the directions in writing, or allow others who are unfamiliar with the geographic area to follow them from a particular starting point to a particular destination.

BRIEF DESCRIPTION OF THE DRAWINGS

FIGS. 1A-1C are diagrams that illustrate an overview of an implementation described herein;

FIG. 2 is a diagram of an example environment in which systems and/or methods described herein may be implemented;

FIG. 9 is a flow chart of an example process for providing direction information to a user of the follow me device;

FIGS. 10A-10K illustrate an example of the processes described in FIGS. 8 and 9; and FIGS. 11A-11E illustrate an example of recording and providing personalized directions.

DETAILED DESCRIPTION OF PREFERRED EMBODIMENTS

The following detailed description refers to the accompanying drawings. The same reference numbers in different drawings may identify the same or similar elements.

Figure 1B:
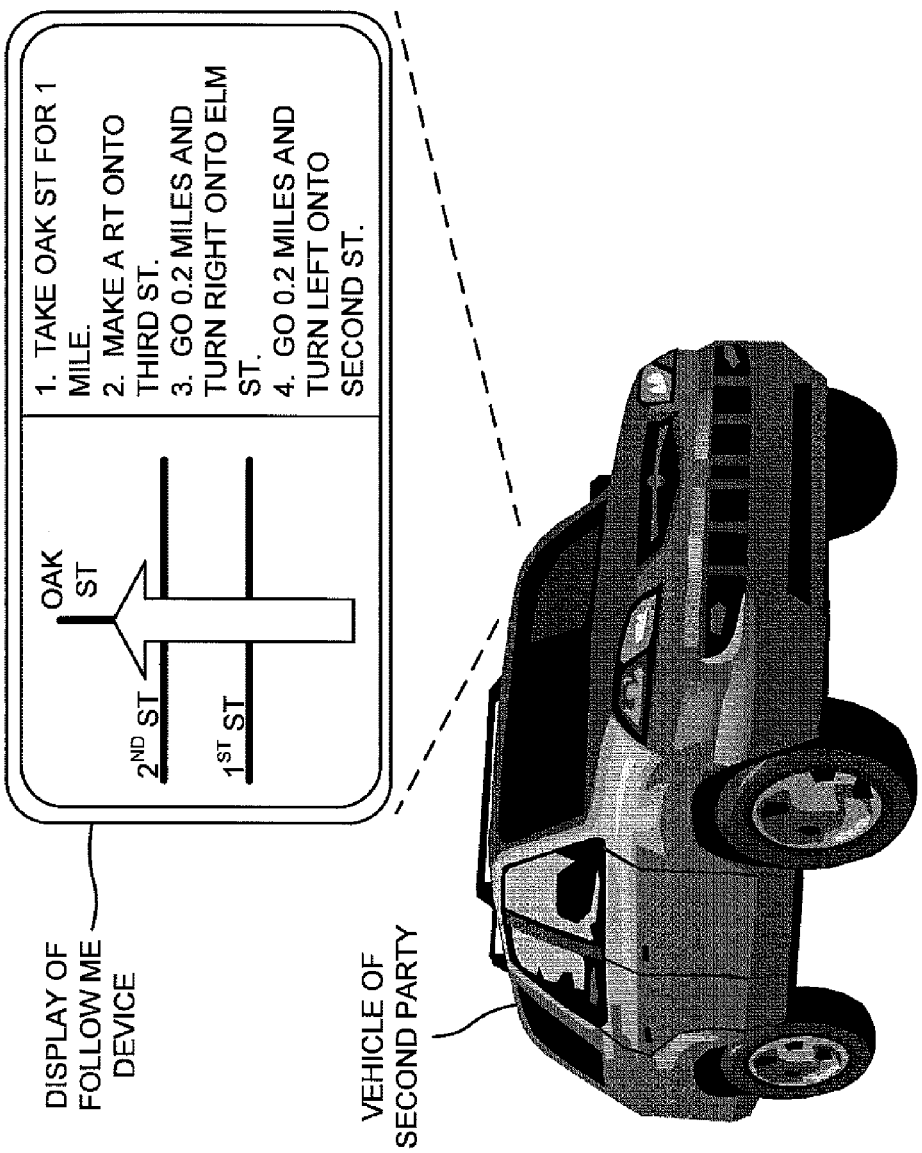
Figure 1C:
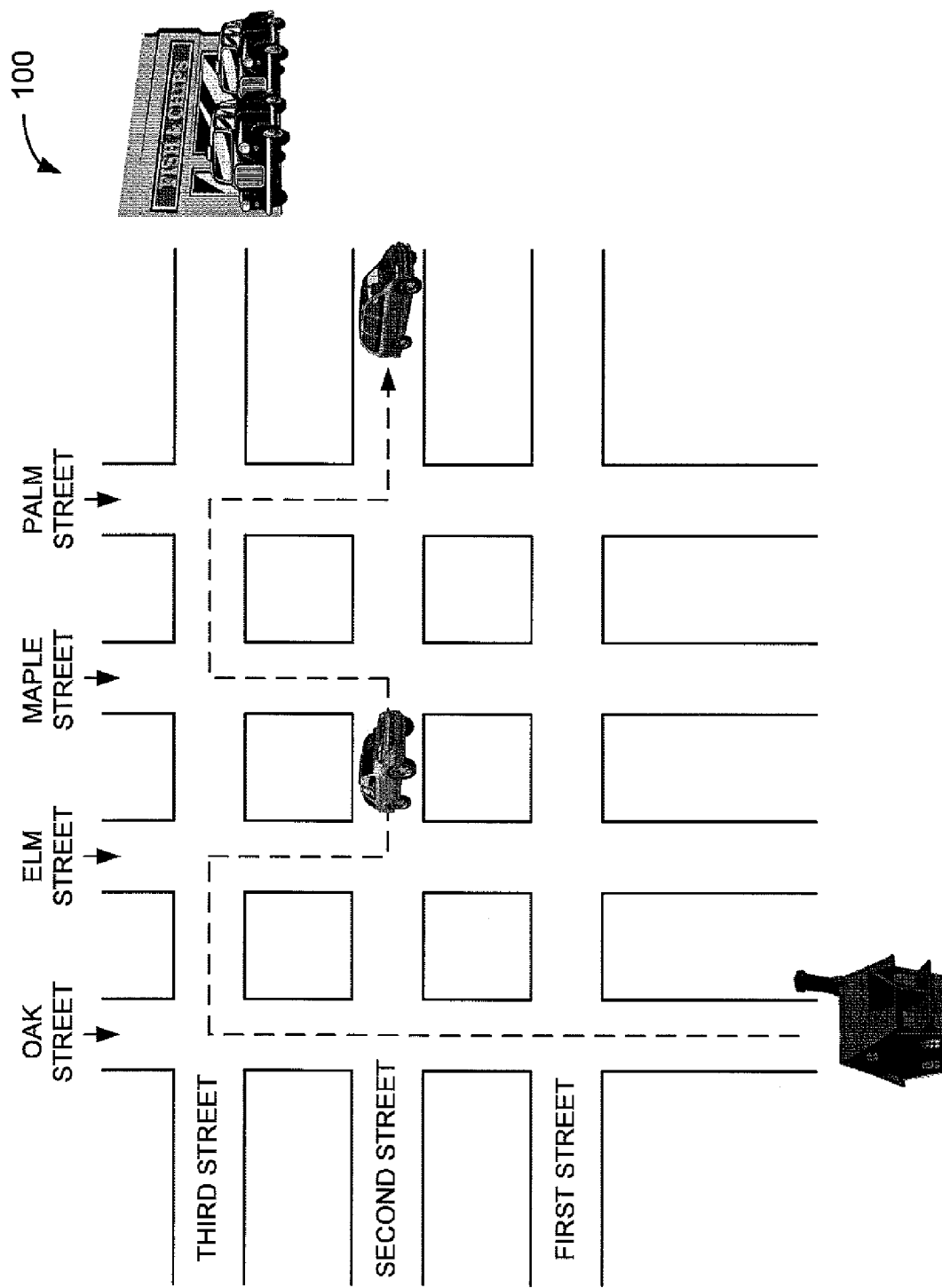

FIGS. 1A-1C are diagrams that illustrate an overview 100 of an implementation described herein. Assume that a first party and a second party are visiting with a third party at the third party's house. Assume further that the first party and the second party have plans to meet at a restaurant after their visit at the third party's house and that the first party knows a route for getting to the restaurant that will avoid rush hour traffic. The second party could follow the first party to the restaurant. In one implementation, the first party's vehicle may include a direction recording device that records information relating to the exact route traveled by the first party from the third party's house to the restaurant. The direction recording device may transfer the recorded information to a follow me device in the second party's vehicle that allows the second party to follow the exact same route traveled by the first party.

With reference to FIG. 1A, the first party may drive to the restaurant from the third party's house. While the first party is driving to the restaurant, the direction recording device may record the information relating to the route driven by the first party, and may transfer this recorded information to the follow me device within the second party's vehicle. As illustrated in FIG. 1B, the follow me device within the second party's vehicle may display the information relating to the route to the second party. As illustrated in FIG. 1C, the second party may then follow the exact same route driven by the first party to get to the restaurant based on the information relating to the route.

FIG. 2 is a diagram of an example environment 200 in which systems and/or methods described herein may be implemented. As shown in FIG. 2, environment 200 may include a direction recording device 210, a follow me device 220, and a server 230 interconnected by a network 240. The number of components illustrated in FIG. 2 has been provided for simplicity. In practice, there may be more or fewer direction recording devices 210, follow me devices 220, servers 230, and/or networks 240. Also, in some implementations, one or more of the devices illustrated in FIG. 2 may perform one or more functions described as being performed by another device in FIG. 2.

Direction recording device 210 may include one or more devices that record information relating to a route traveled by direction recording device 210. In one implementation, direction recording device 210 may record information that allows direction recording device 210 or another device to identify paths (e.g., roads, highways, routes, streets, etc.) traveled by direction recording device 210 and the distance traveled along each highway/route/street.

In addition, direction recording device 210 may allow a user to record textual annotations and/or voice messages, and direction recording device 210 and/or the user may associate each of the recorded textual annotations and/or voice messages with a particular location of the route. The textual annotations may include, for example, notes about the particular location. The voice messages may include audio that provides a description of the location. Furthermore, direction recording device 210 may allow a user to record and/or download images (e.g., photographs) and/or videos, and to associate each of the images and/or videos with particular locations of the route. In some implementations, the user may download the images from other devices, such as cameras, that are connected to direction recording device 20. Direction recording device 210 may also record other information, such as a date and/or a time that the information relating to the route is recorded, information relating to the speed at which direction recording device 210 traveled along the route, etc. All of the information recorded by direction recording device 210 will collectively be referred to as "direction information" hereinafter.

Direction recording device 210 may transfer recorded direction information to another device, such as follow me device 220 or server 230. Direction recording device 210 may be implemented in a device, such as a vehicle navigation system, a navigation device, a mobile device (e.g., a cell phone, a smart phone, a personal digital assistant (PDA), etc.), a computer device (e.g., a handheld computer, a laptop computer, a tablet computer, etc.), and/or another type of device. Direction recording device 210 may connect to network 240 via wired and/or wireless connections.

Follow me device 220 may include one or more devices that receive the recorded direction information, and that determine a route based on the recorded direction information. In one implementation, follow me device 220 may provide information relating to the determined route to a user to allow the user to traverse the determined route. Follow me device 220 may display an item that corresponds to follow me device 220 (or a vehicle in which follow me device is located) on the route being traversed by follow me device 220. In addition, follow me device 220 may simultaneously display a second item that corresponds to a current location (e.g., along the route) of direction recording device 210 on the route or at a destination. Follow me device 220 may also provide additional information, such as a speed at which direction recording device 210 is currently traveling, a speed at which direction recording device 210 was traveling when direction recording device 210 was at the same point along the route at which follow me device 220 is currently located, textual annotations, voice messages, images, videos, etc.

Follow me device 220 may be implemented in a device, such as a vehicle navigation system, a navigation device, a mobile device (e.g., a cell phone, a smart phone, a PDA, etc.), a computer device (e.g., a handheld computer, a laptop computer, a tablet computer, etc.). In one implementation, direction recording device 210 and follow me device 220 may include the same or a different type of such devices. Follow me device 220 may connect to network 240 via wired and/or wireless connections.

Server 230 may include one or more devices that receive direction information from direction recording device 210. Server 230 may also store the direction information, and provide the direction information to follow me device 220.

In some implementations, server 230 may store information related to formats supported by direction recording device 210 and follow me device 220. Server 230 may convert the stored direction information from a format supported by direction recording device 210 to a different format supported by follow me device 220. Server 230 may provide the direction information to follow me device 220 in the different format that is supported by follow me device 220. Server 230 may include one or more types of computer systems, such as server devices, minicomputers, personal computers, laptop computers, and/or the like.

Network 240 may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), a private network, an ad hoc network, the Internet, an intranet, and/or a combination of these or other types of networks.

Figure 3:
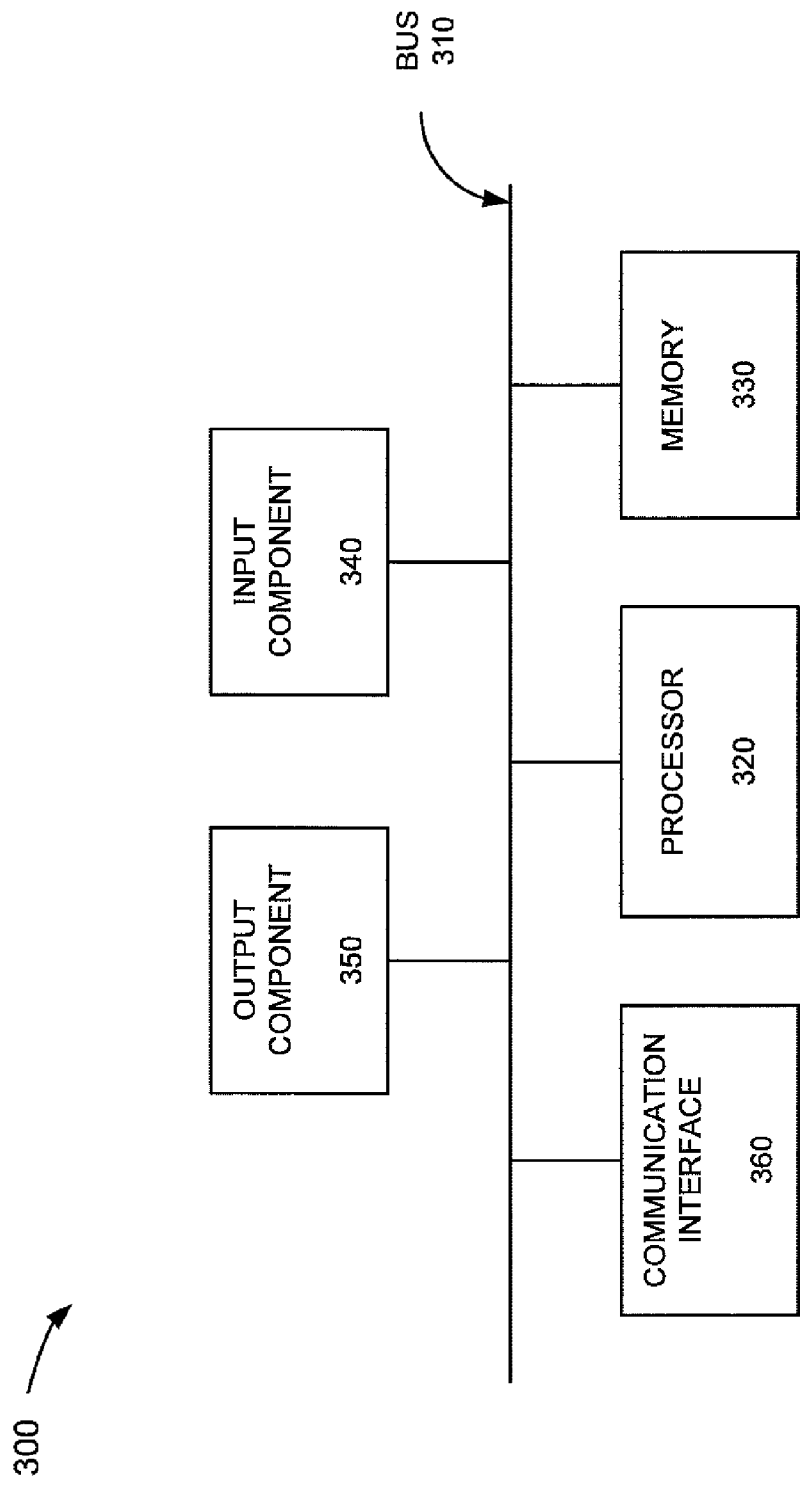
FIG. 3 is a diagram of example components of a device that corresponds to a direction recording device and/or a follow me device of FIG. 2.

FIG. 3 is a diagram of example components of a device 300 that may correspond to direction recording device 210 and/or follow me device 220. Alternatively, each of direction recording device 210 and/or follow me device 220 may include one or more devices 300 and/or one or more components of device 300. As shown in FIG. 3, device 300 may include a bus 310, processor 320, a memory 330, an input component 340, an output component 350, and a communication interface 360. Although FIG. 3 shows example components of device 300, in other implementations, device 300 may contain fewer components, additional components, different components, and/or differently arranged components than depicted in FIG. 3. Additionally, or alternatively, one or more components of device 300 may perform one or more tasks described as being performed by one or more other components of device 300.

Bus 310 may include a path that permits communication among the components of device 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320.

Input component 340 may include any mechanism that allows a user to input information to device 300, such as a keyboard, a keypad, a mouse, a pen, a biometric mechanism, such as a voice recognition device, a touch screen, etc. Output component 350 may include a mechanism that outputs information to the user, such as a display, a speaker, etc.

Communication interface 360 may include any transceiver-like mechanism that enables device 300 to communicate with other devices and/or systems, such as server 230, via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 360 may include mechanisms for communicating with another device or system via a network, such as network 240. In some implementations, communication interface 360 may be a logical component that includes input and output ports, input and output systems, and/or other input and output components that facilitate the transmission of data to other devices.

As described herein, device 300 may perform processes in response to processor 320 executing software instructions (e.g., computer program(s)) contained in a computer-readable medium, such as memory 330 or a secondary storage device (e.g., hard disk, CD-ROM, etc.). A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
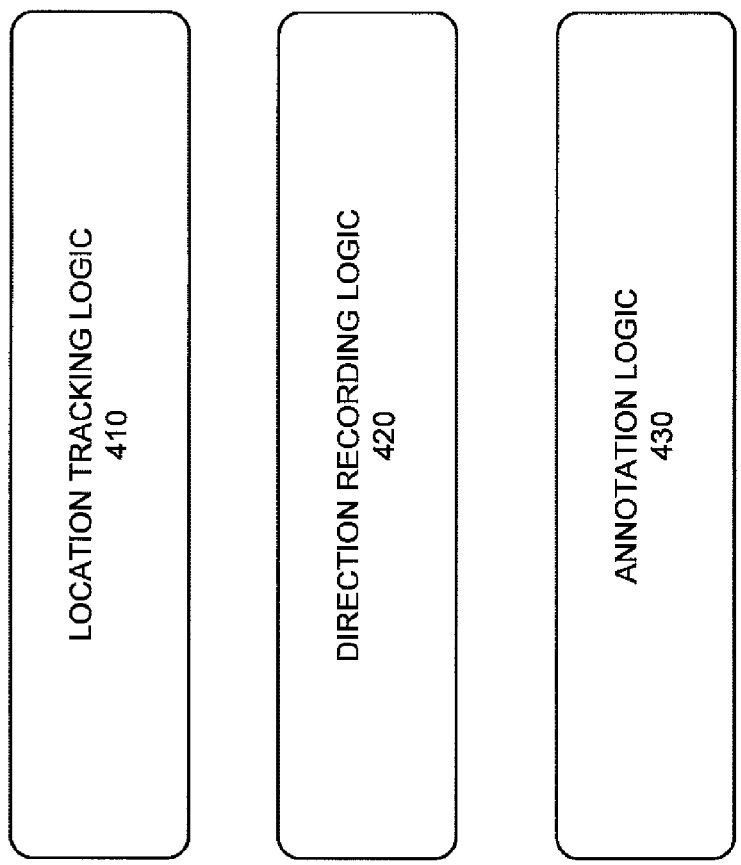
FIG. 4 is a diagram of example functional components of the direction recording device of FIG. 2.

FIG. 4 is a diagram of example functional components of direction recording device 210. As shown in FIG. 4, direction recording device 210 may include location tracking logic 410, direction recording logic 420, and annotation logic 430. The number of functional components illustrated in FIG. 4 is provided for simplicity, and direction recording device 210 may include additional and/or different functional components than illustrated in FIG. 4. Moreover, one or more functional components illustrated in FIG. 4 may perform one or more tasks described as being performed by one or more other functional components of FIG. 4. In one implementation, the functions described in connection with FIG. 4 may be performed by one or more components of device 300 (FIG. 3) or by one or more devices 300.

Location tracking logic 410 may capture location information associated with direction recording device 210. The location information may include, for example, Global Positioning Satellite (GPS) data and/or one or more other types of location information (e.g., coordinates, such as a latitude and a longitude). Location tracking logic 410 may capture the location information at predetermined intervals (e.g., in milliseconds, seconds, etc.). A user, of direction recording device 210, may configure the predetermined intervals.

Direction recording logic 420 may record the location information captured by location tracking logic 410. In one implementation, direction recording logic 420 may use the location information to determine a highway, a route, a street, etc., and may record a sequence of highways, routes, streets, etc. traveled by direction recording device 210.

Annotation logic 430 may capture messages from a user associated with direction recording device 210. The messages may include, for example, text messages and/or voice messages Annotation logic 430 may associate a captured message with a location of direction recording logic 210 at the time that the message is captured. In other implementations, the messages may further include images and videos that are capturing and/or downloaded by direction recording device 210, and associating the images and videos with locations of direction recording logic 210. Annotation logic 430 and/or another functional component of direction recording device 210 may create mapping(s) between the location information and corresponding messages.

Figure 5:
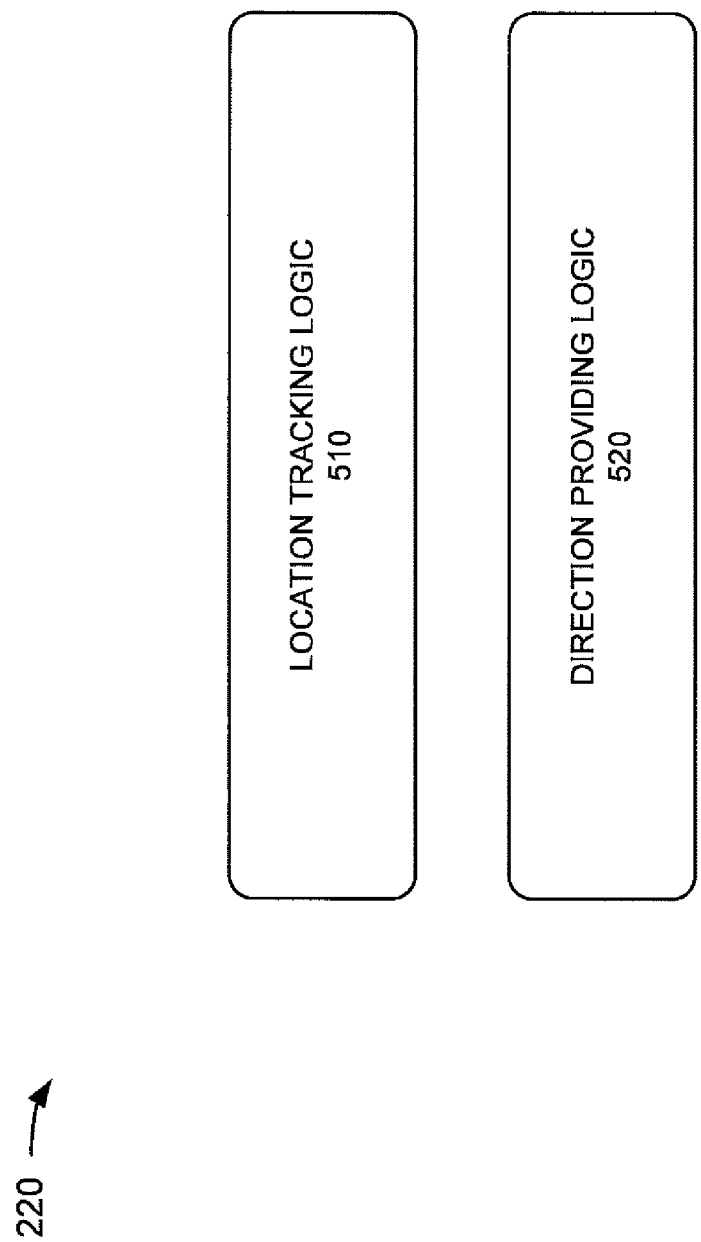
FIG. 5 is a diagram of example functional components of the follow me device of FIG. 2.

FIG. 5 is a diagram of example functional components of follow me device 220. As shown in FIG. 5, follow me device 220 may include location tracking logic 510 and direction providing logic 520. The number of functional components illustrated in FIG. 5 is provided for simplicity, and follow me device 220 may include additional and/or different functional components than illustrated in FIG. 5. Moreover, one or more functional components illustrated in FIG. 5 may perform one or more tasks described as being performed by one or more other functional components of FIG. 5. In one implementation, the functions described in connection with FIG. 5 may be performed by one or more components of device 300 (FIG. 3) or by one or more devices 300.

Location tracking logic 510 may capture location information associated with follow me device 220. The location information may include, for example, GPS data and/or one or more other types of location information. Location tracking logic 510 may capture the location information at predetermined intervals. A user, of follow me device 220, may configure the predetermined intervals.

Direction providing logic 520 may provide location information to the user. In one implementation, direction providing logic 520 may provide the location information visually and/or audibly to the user. The location information may include, for example, the location information captured by location tracking logic 510. In addition, the location information may include the direction information recorded by direction recording device 210 and provided to follow me device 220. Furthermore, direction providing logic 520 may display text messages and/or images and/or play voice messages and/or videos that are captured by direction recording device 210 and are associated with (e.g., mapped to) the provided location information.

Additionally, or alternatively, direction providing logic 520 may provide directions (e.g., driving directions) to the user of follow me device 220 based on the location information captured by location tracking logic 510 and the direction information recorded by direction recording device 210. The user may use the provided directions to follow the route taken by a user of direction recording device 210.

Figure 6:
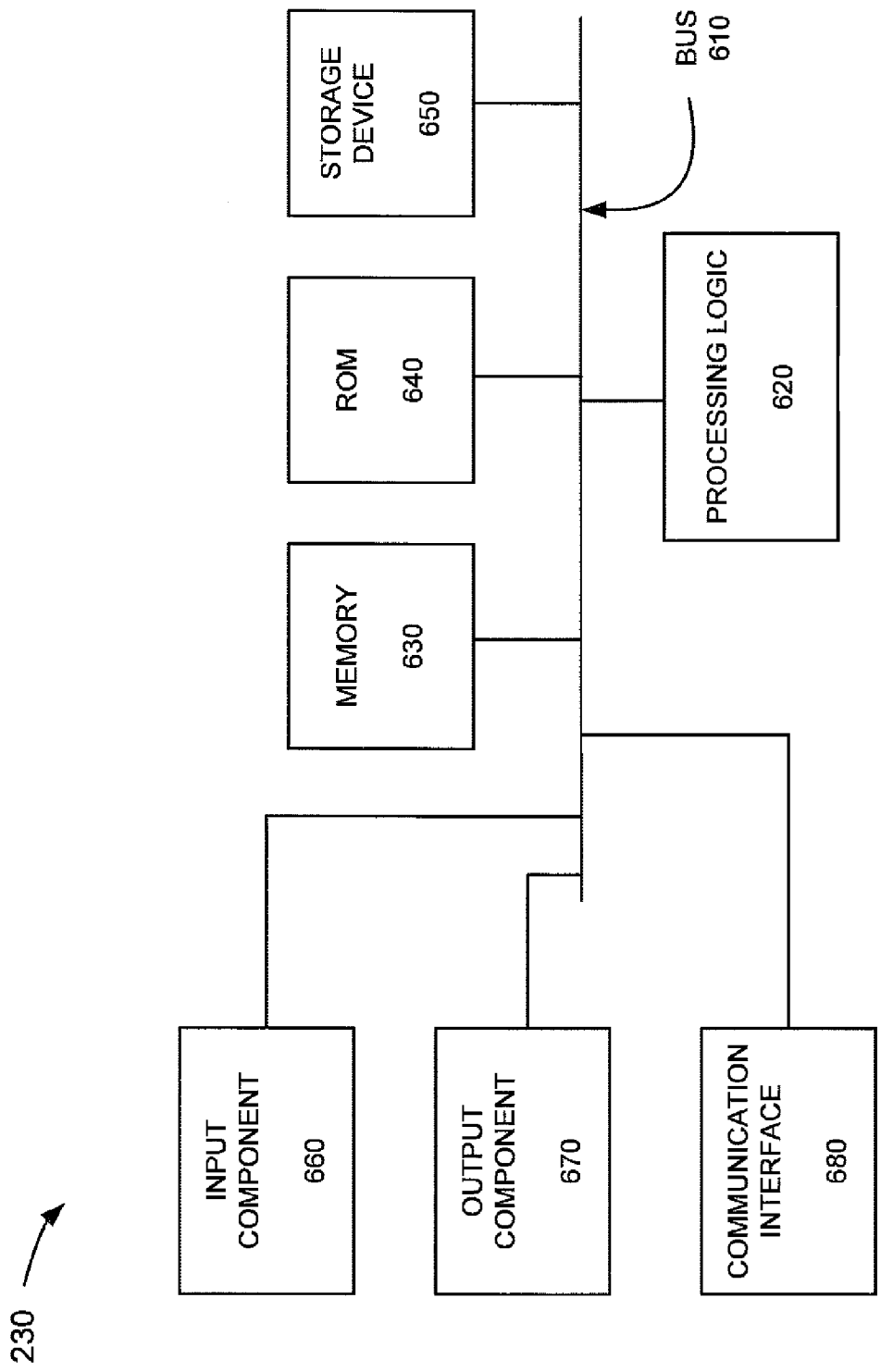
FIG. 6 is a diagram of example components of a server of FIG. 2.

FIG. 6 is a diagram of example components of server 230. As shown in FIG. 6, server 230 may include a bus 610, a processor 620, memory 630, a read only memory (ROM) 640, a storage device 650, an input component 660, an output component 670, and a communication interface 680. Although FIG. 6 shows example components of server 230, in other implementations, server 230 may contain fewer components, additional components, different components, and/or differently arranged components than depicted in FIG. 6. Additionally, or alternatively, one or more components of server 230 may perform one or more tasks described as being performed by one or more other components of server 230.

Bus 410 may include a path that permits communication among the components of server 230. Processor 620 may include a processor, a microprocessor, or processing logic that may interpret and execute instructions. Memory 630 may include a random access memory (RAM) or another type of dynamic storage device that stores information and instructions for execution by processor 620. ROM 640 may include a ROM device and/or another type of static storage device that stores static information and instructions for processor 620. Storage device 650 may include some other type of magnetic or optical recording medium and its corresponding drive for storing information and/or instructions.

Input component 660 may include a mechanism that allows a user to input information to server 230, such as a keyboard, a keypad, a mouse, a pen, a biometric mechanism, such as a voice recognition device, a touch screen, etc. Output component 670 may include a mechanism that outputs information to the user, including a display, a speaker, etc. Communication interface 680 may include any transceiver-like mechanism that enables server 230 to communicate with other devices and/or systems, such as direction recording device 210 and follow me device 220, via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications.

As described herein, server 230 may perform processes in response to processor 620 executing software instructions contained in a computer-readable medium, such as memory 630 or a secondary storage device (e.g., hard disk, CD-ROM, etc.), such as storage device 650. The software instructions may be read into memory 630 from another computer-readable medium or from another device. The software instructions contained in memory 630 may cause processor 620 to perform processes described herein. Alternatively, hardwired circuitry may be used in place of or in combination with software instructions to implement processes described herein. Thus, implementations described herein are not limited to any specific combination of hardware circuitry and software.

Figure 7:
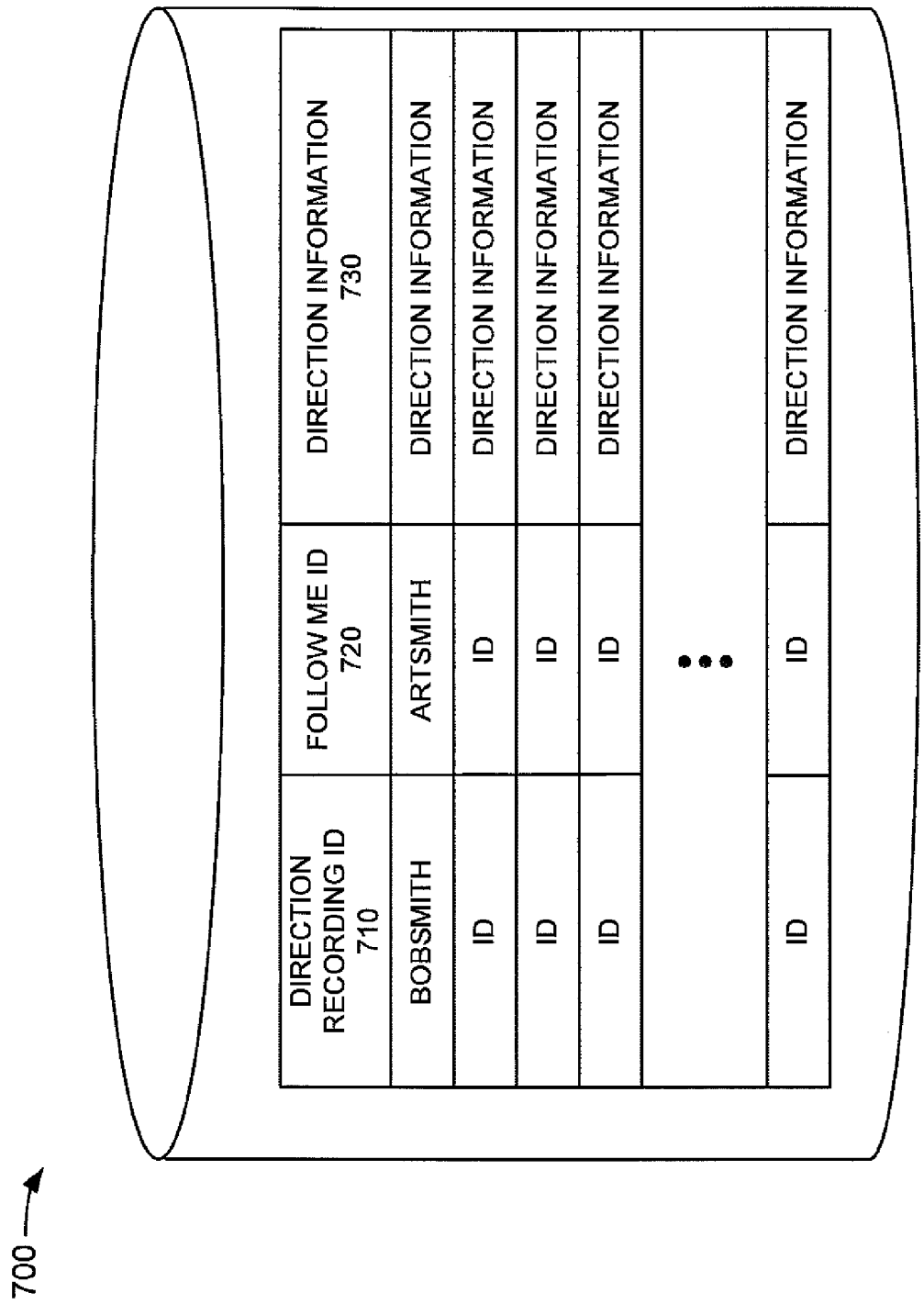
FIG. 7 is a diagram of an example data structure that may be stored by the server of FIG. 2.

FIG. 7 is a diagram of an example data structure 700 that may be stored by server 230. In some implementations, data structure 700 may be stored by multiple databases at server 230, and/or by databases stored at one or more different and possibly remote locations. As shown in FIG. 7, data structure 700 may includes a group of entries. Each entry may include information stored in one or more of the following fields: a direction recording device identifier (ID) field 710, a follow me device identifier field 720, and a direction information field 730. In some implementations, data structure 700 may include fewer fields, different fields, additional fields, and/or differently arranged fields than shown in FIG. 7.

Direction recording device identifier field 710 may store a sequence of characters that identifies direction recording device 210. The identifier may include, for example, a unique group of characters. Follow me device identifier field 720 may store a sequence of characters that identifies follow me device 220. The identifier may include, for example, a unique group of characters.

Direction information field 730 may store direction information recorded by the direction recording device 210. As indicated above, the direction information may include, for example, the exact route that the direction recording device 210 travels (e.g., including identification of each highway, route, street, etc. traversed), coordinates (such as latitudes and longitudes) of all locations traversed along the route, textual annotations and/or voice messages recorded by a user associated with direction recording device 210, images and/or videos associated with direction recording device 210, a date and/or a time that the information relating to the route is recorded, information relating to the speed at which direction recording device 210 traveled along the route, etc.

Figure 8:
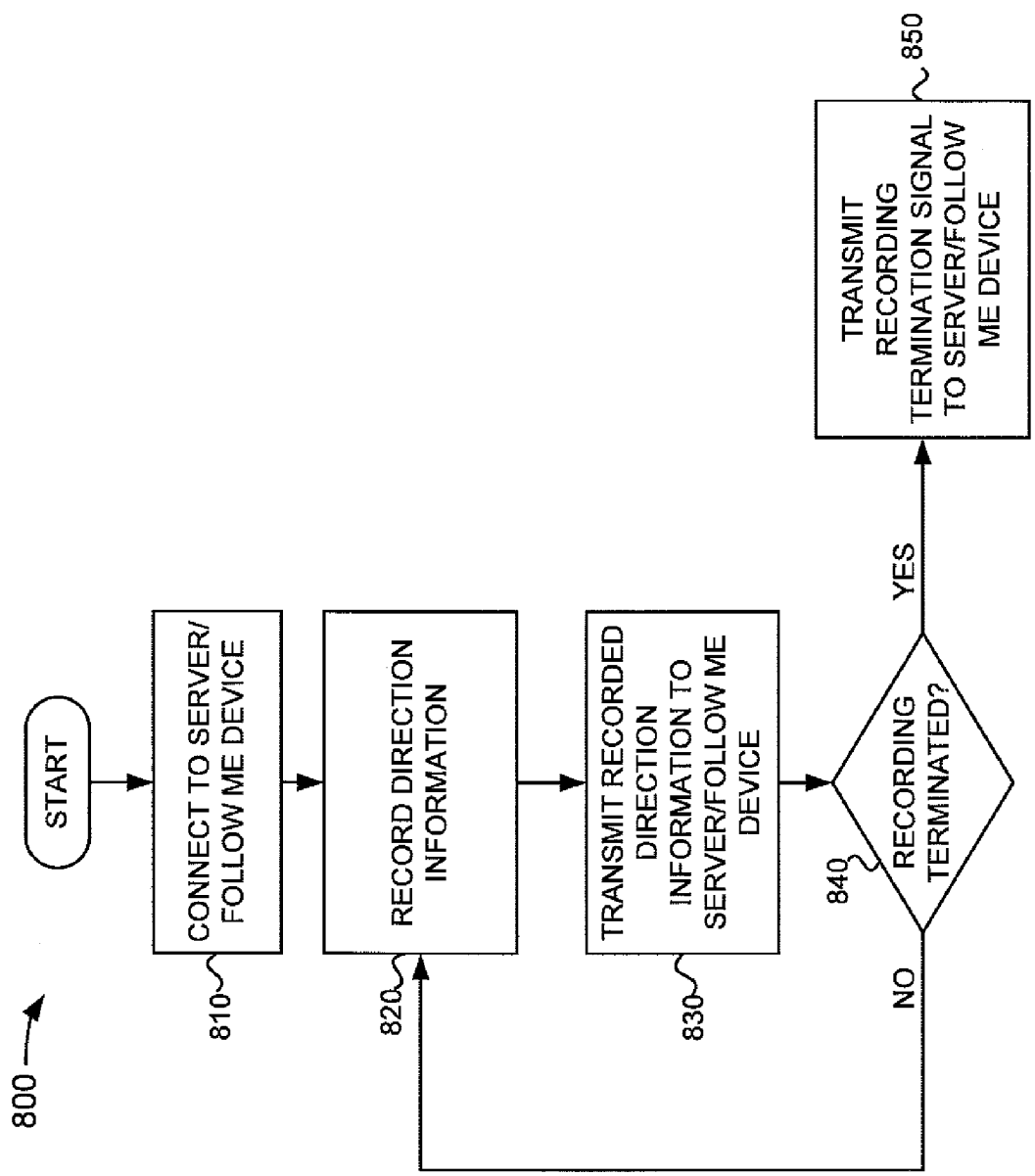
FIG. 8 is a flow chart of an example process for providing direction information to a follow me device.

FIG. 8 is a flow chart of an example process 800 for providing direction information to follow me device 220. In one implementation, process 800 may be performed by direction recording device 210. Alternatively, or additionally, some or all of process 800 may be performed by another device or group of devices, including or excluding direction recording device 210.

As shown in FIG. 8, process 800 may include connecting to a server and/or a follow me device (block 810). For example, direction recording device 210 may provide a graphical user interface to a user that allows the user to connect direction recording device 210 to server 230 and/or follow me device 220. In one implementation, the graphical user interface may allow the user to enter an identifier for server 230 and/or follow me device 220 that may allow direction recording device 210 to connect to server 230 and/or follow me device 220.

Process 800 may further include recording direction information (block 820). For example, direction recording device 210 (e.g., location tracking logic 410) may capture a current location of direction recording device 210. In one implementation, direction recording device 210 may use the captured location to identify the path (e.g., highway, route, street, road, etc.) on which direction recording device 210 is currently located. In addition to location information, direction recording device 210 may record annotations, time/date information, speed information, etc. associated with direction recording device 210.

Process 800 may also include transmitting the recorded direction information to the server and/or the follow me device (block 830). For example, direction recording device 210 may transmit the recorded direction information periodically (e.g., at a user-configurable time interval) and/or in response to an event (e.g., a request from server 230 and/or follow me device 220, a command from the user, new direction information being received by direction recording device 210, etc.). When the direction information is transmitted to follow me device 220, follow me device 220 may display the direction information to a user associated with follow me device 220. When the direction information is transmitted to server 230, server 230 may store the direction information (e.g., in data structure 700) and/or forward (i.e., transmit) the direction information to follow me device 220.

In some implementations, server 230 may determine a type of format supported by follow me device 220. Server 230 may further determine whether a format of the received/stored direction information matches the type of format. When server 230 determines that the format of the direction information does not match the type of format, server 230 may convert the direction information into the type of format before transmitting the direction information to follow me device 220.

Returning to FIG. 8, process 800 may also include determining whether the recording of direction information has been terminated (block 840). In one implementation, direction recording device 210 may determine whether the recording of direction information has been terminated. For example, direction recording device 210 may determine that direction information is no longer to be recorded when the user commands direction recording device 210 to terminate recording the direction information, when direction recording device 210 is turned off, etc. Otherwise, direction recording device 210 may determine that the recording of direction information has not been terminated.

If the recording of direction information has not been terminated (block 840—NO), process 800 may include continuing to record direction information (block 820). For example, when direction recording device 210 determines that the recording of direction information has not been terminated, direction recording device 210 may continue to record direction information, as described above with reference to block 820.

If the recording of direction information has been terminated (block 840—YES), process 800 may include transmitting a recording termination signal to server 230 and/or follow me device 220 (block 850). For example, when direction recording device 210 determines that the recording of direction information has been terminated, direction recording device 210 may transmit a recording termination signal to server 230 and/or follow me device 220. The recording termination signal may indicate to server 230 and/or follow me device 220 that the direction recording session has been terminated.

FIG. 9 is a flow chart of an example process 900 for providing direction information to a user. In one implementation, process 900 may be performed by follow me device 220. In another implementation, some or all of process 900 may be performed by another device or group of devices, including or excluding follow me device 220.

As shown in FIG. 9, process 900 may include connecting to a server and/or a direction recording device (block 910). For example, follow me device 220 may provide a graphical user interface to a user that allows the user to connect follow me device 220 to server 230 and/or direction recording device 210. In one implementation, the graphical user interface may allow the user to enter an identifier for server 230 and/or direction recording device 210 that may allow follow me device 220 to connect to server 230 and/or direction recording device 210. In some implementations, when follow me device 220 connects to server 230, server 230 may determine a type of format, for the direction information, that is supported by follow me device 220.

Process 900 may further include capturing current location information of the follow me device (block 920). For example, follow me device 220 (e.g., location tracking logic 510) may capture a current location of follow me device 220. In one implementation, follow me device 220 may use the captured location to identify the path (e.g., highway, route, street, etc.) on which follow me device 220 is currently located.

Process 900 may also include receiving recorded direction information from the server and/or the direction recording device (block 930). For example, follow me device 220 may receive, from server 230 or direction recording device 210, direction information for all or a portion of a route recorded by direction recording device 210. The direction information may be current (e.g., including information regarding a current location of direction recording device 210) or old (e.g., including past information regarding a past location of direction recording device 210). The past information may be from the same day or a different day). The received direction information may be in a type of format that is supported by follow me device 220. In some instances, when follow me device 220 receives the direction information from server 230, the type of format of the received direction information may be different from a type of format of the direction information provided by direction recording device 210 to server 230.

Process 900 may also include determining a route based on the current location of the follow me device and the recorded direction information (block 940). For example, follow me device 220 may use the recorded direction information and the current location of follow me device 220 to determine a route for providing to a user associated with follow me device 220. The route may include the same highways, routes, streets, etc. that direction recording device 210 traveled. In some instances, follow me device 220 may calculate a route based on the recorded direction information and the current location of follow me device 220.

Process 900 may also include providing the route and/or other direction information to the user (block 950). In one implementation, follow me device 220 may simultaneously provide the current location of follow me device 220 and the current location of direction recording device 210. Alternatively, or additionally, follow me device 220 may provide additional information contained in the recorded direction information, such as, for example, a speed at which direction recording device 210 traveled along the stretch of the route at which follow me device 220 is currently located.

Figure 10A:
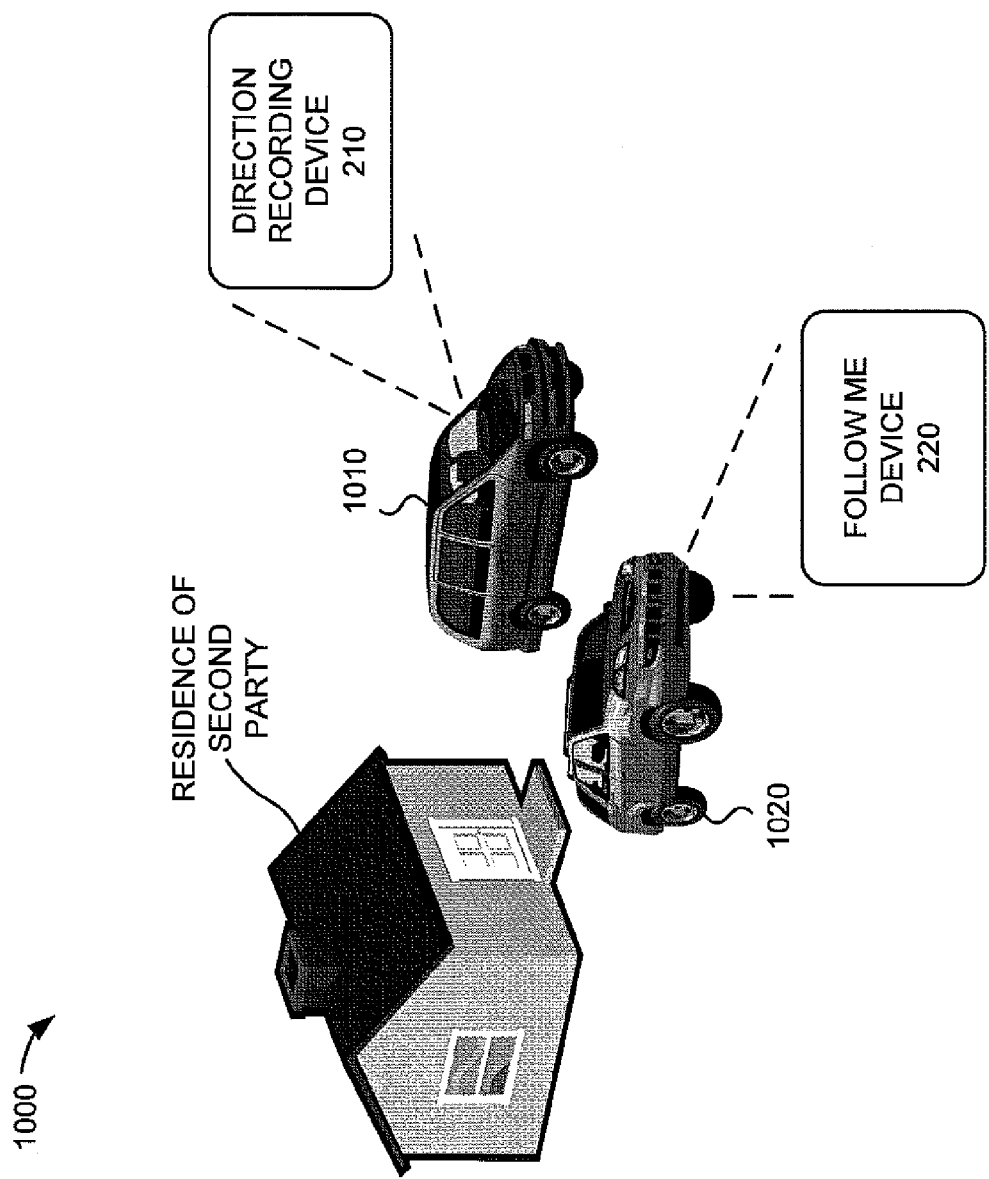

FIGS. 10A-10K illustrate an example 1000 of the processes described in FIGS. 8 and 9. With reference to FIG. 10A, assume that a first party, associated with a first vehicle 1010, and a second party, associated with a second vehicle 1020, are at the second party's residence. Assume further that the first and second parties have agreed to go to the first party's residence and that the second party does not know how to get to the first party's residence. Moreover, assume that the first party and the second party are unable to leave at the same time. Thus, the second party is unable to follow the first party to the first party's residence. Further assume that first vehicle 1010 includes direction recording device 210 and that second vehicle 1020 includes follow me device 220.

The first party may connect direction recording device 210 to follow me device 220 or server 230. In example 1000, assume that the first party causes direction recording device 210 to connect to server 230. In other implementations, the first party may cause direction recording device 210 to connect directly to follow me device 220 (e.g., in a peer-to-peer manner).

Figure 10B:
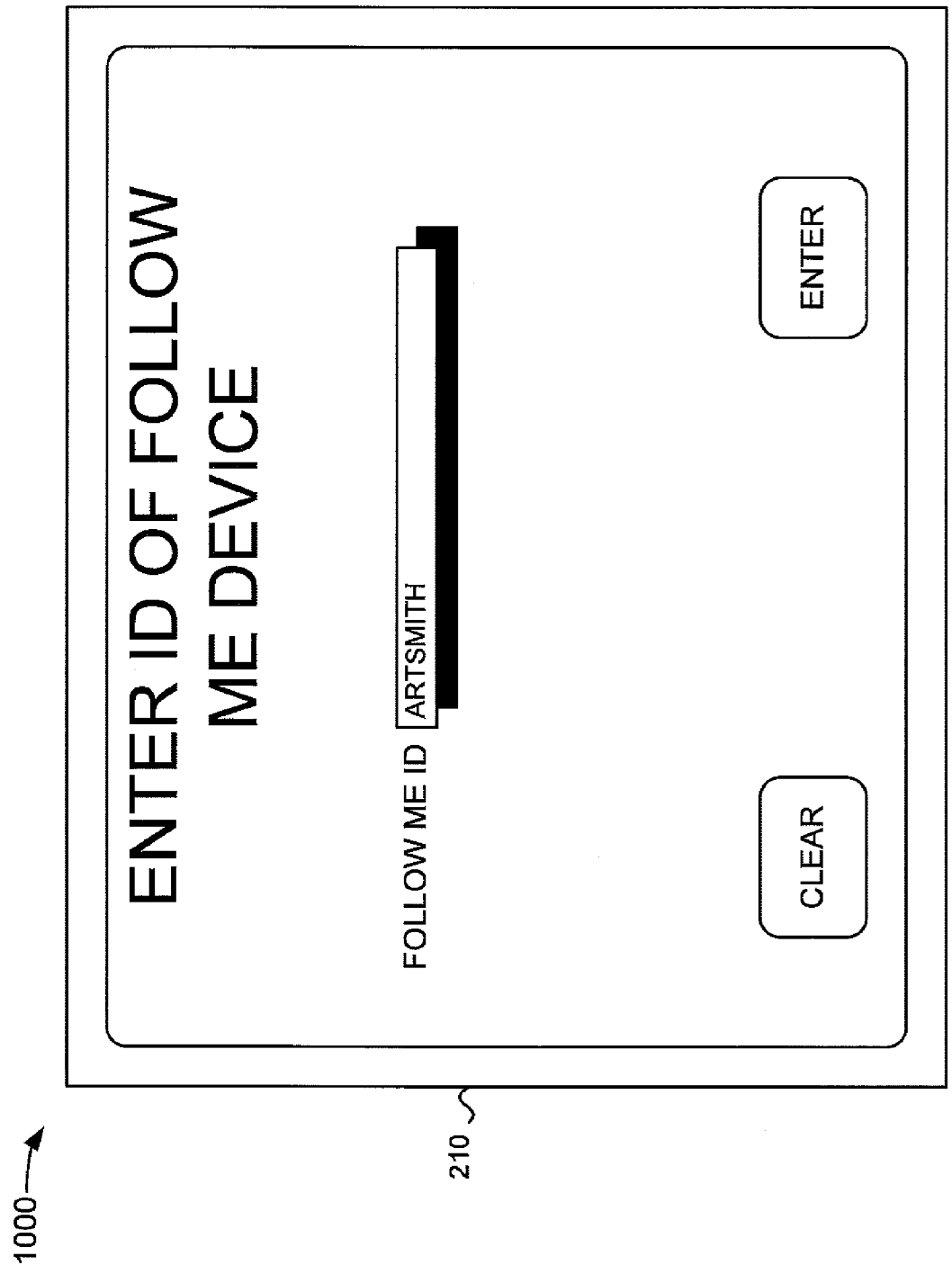
Figure 10C:
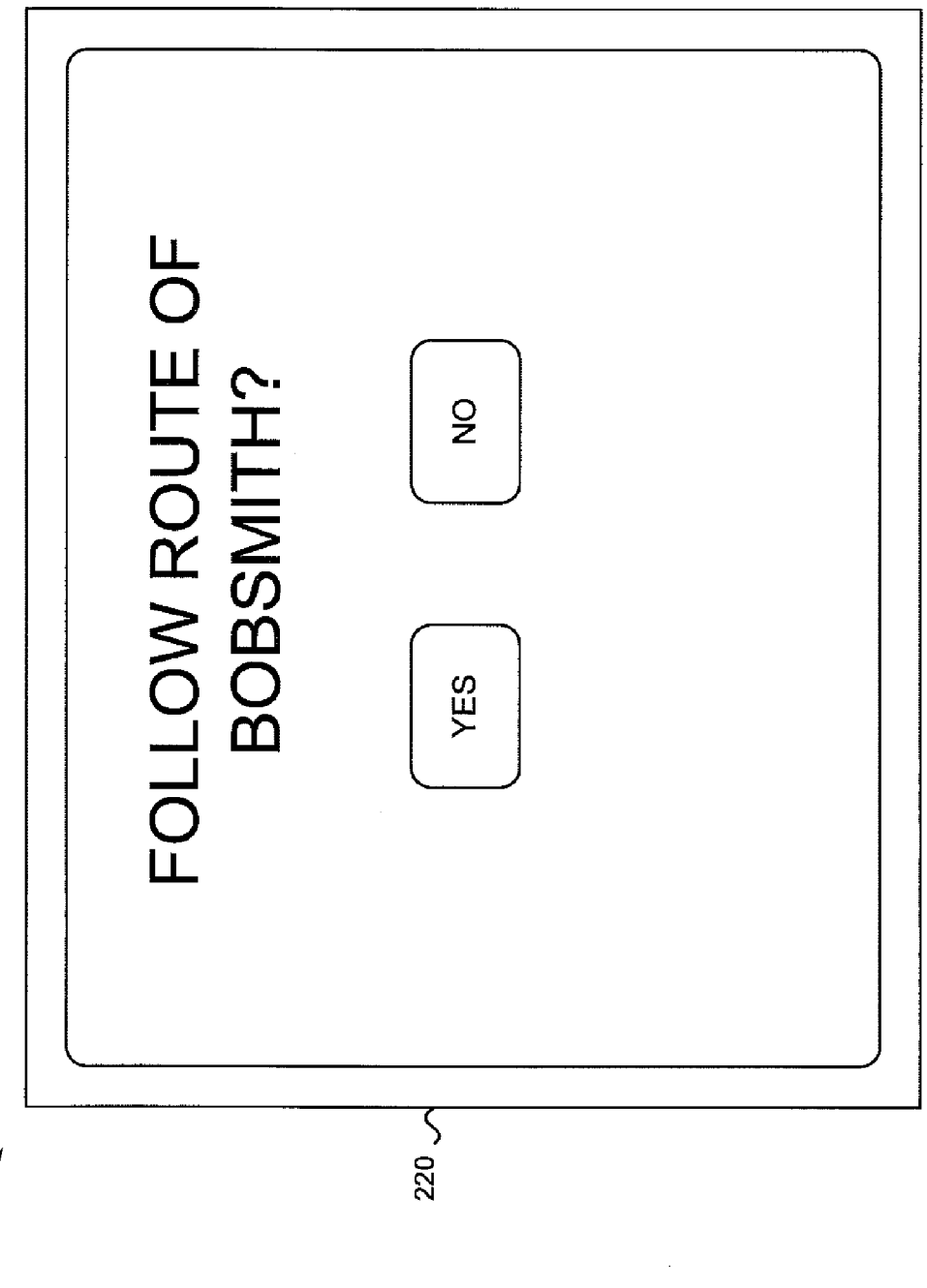

As shown in FIG. 10B, direction recording device 210 may provide (e.g., display) a graphical user interface that allows the first party to identify the particular follow me device to which direction information is to be provided. Assume that the first party enters an identifier of "ARTSMITH" that identifies follow me device 220. Server 230 may identify follow me device 220 based on the identifier, and may transmit, to follow me device 220, a request to provide the direction information to follow me device 220. As shown in FIG. 10C, follow me device 220 may provide (e.g., display) a graphical user interface that allows the second party to accept the request by selecting the "YES" button. Server 230 may begin transmitting the direction information to follow me device 220, as described further below, after the second party selects the "YES" button.

Figure 10D:
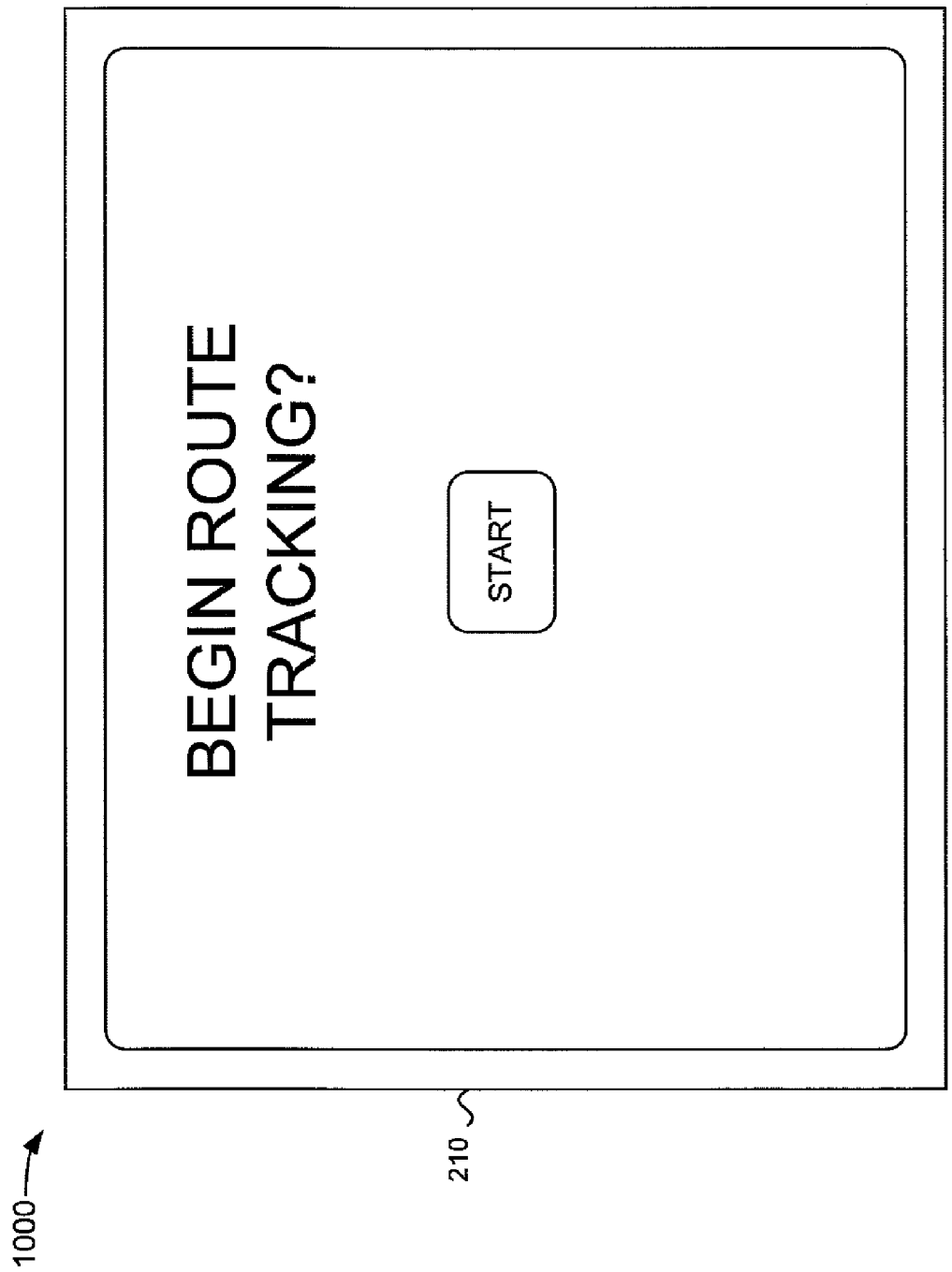

Alternatively, the first party may instruct direction recording device 210 to record and/or store direction information without specifying a follow me device 220. As shown in FIG. 10D, direction recording device 210 may provide a graphical user interface that allows the first party to start the recording of the direction information. As shown in FIG. 10E, follow me device 220 may provide (e.g., display) a graphical user interface that allows the second party to identify the particular direction recording device from which to receive direction information. Assume that the second party enters an identifier of "BOBSMITH" that identifies direction recording device 210. Server 230 may identify direction recording device 210 based on the identifier. Server 230 may begin transmitting the direction information to follow me device 220 after server 230 receives the direction information from direction recording device 210.

Figure 10F:
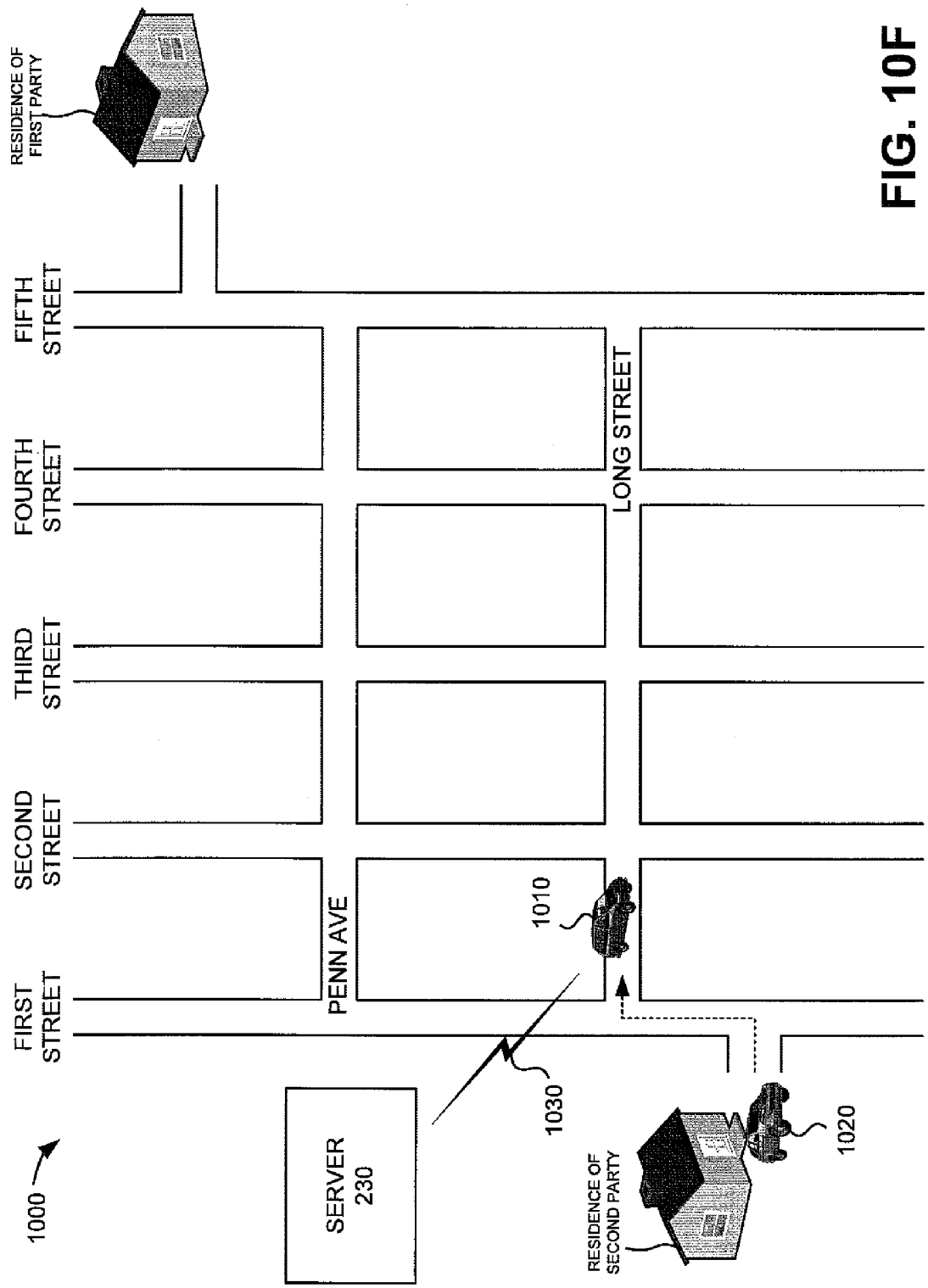

As shown in FIG. 10F, the first party may begin traveling (in first vehicle 1010) to the first party's residence. During the trip, direction recording device 210 may continuously record direction information 1030, and may transmit direction information 1030 to server 230. The direction information may include any of the information described above, such as the names of the highways, routes, streets, etc. traveled, the distance traveled on each highway, route, street, etc., the time/date that first vehicle 1010 traveled on the highway, route, street, etc., the speed at which first vehicle 1010 traveled on the highway, route, street, etc., annotations provided by the first party while traveling on the highway, route, street, etc., and/or one or more other types of information.

Figure 10H:
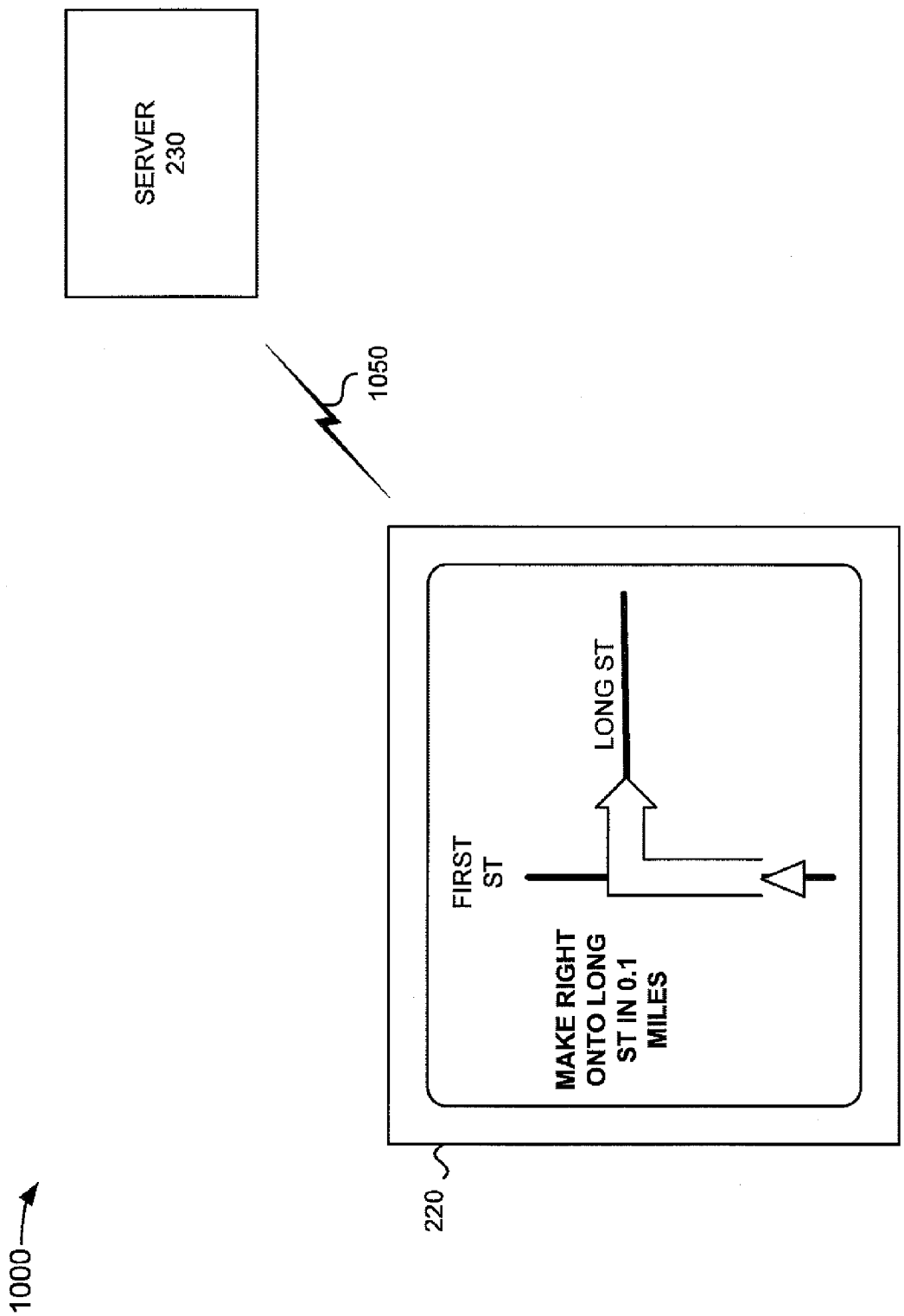

With reference to FIG. 10G, follow me device 220 may begin receiving direction information 1050 from server 230 before the second party begins to travel (in second vehicle 1020) to the first party's residence. Follow me device 220 may provide driving directions to the second party, based on direction information 1050 and a current location of follow me device 220. As shown in FIG. 10H, follow me device 220 may display driving directions, such as "MAKE RIGHT ONTO LONG ST IN 0.1 MILES," based on direction information 1050 and the current location of follow me device 220.

Figure 10I:
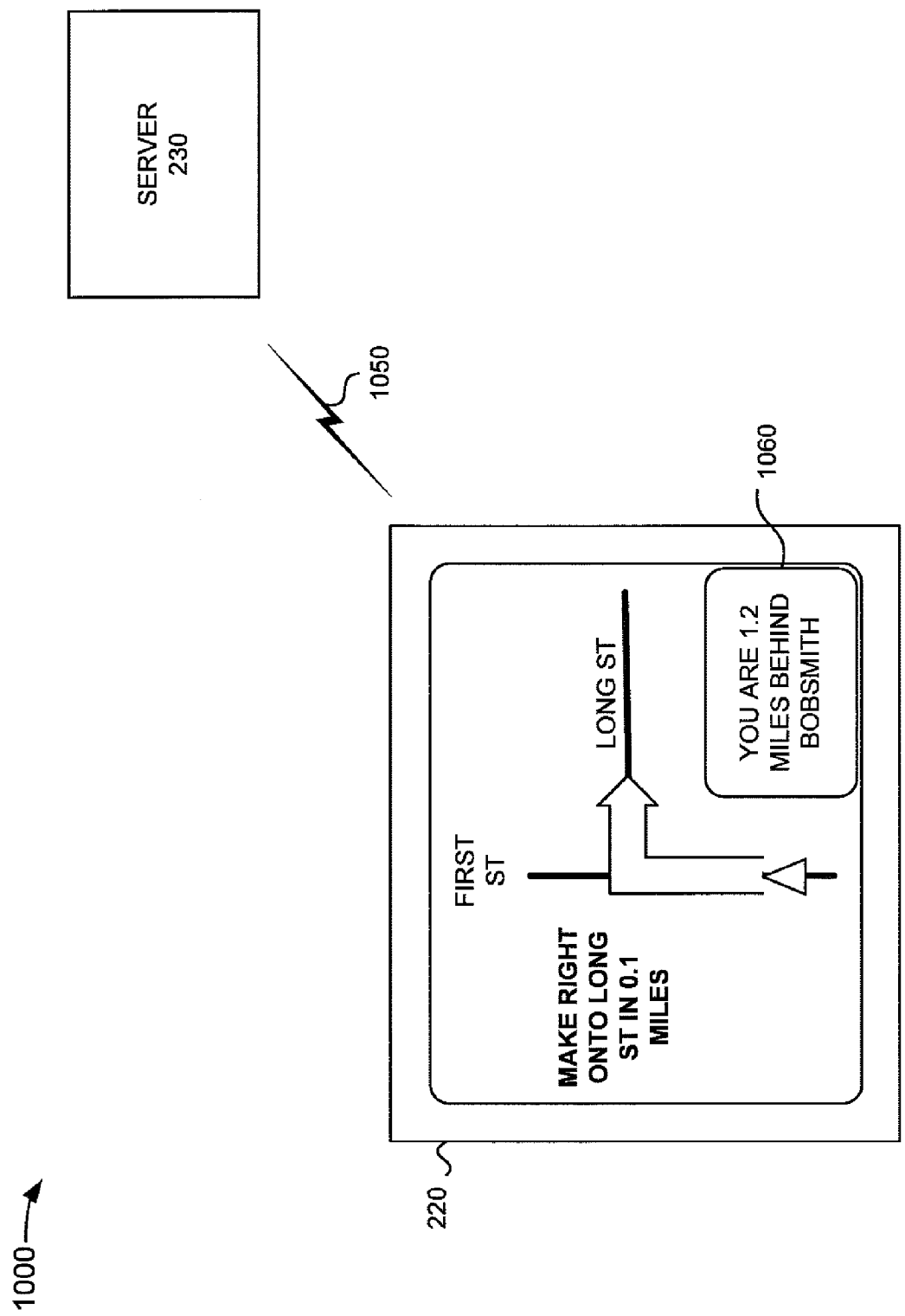

In those situations where first vehicle 1010 has reached the first party's residence, follow me device 220 may provide not only the route that the second party is to follow, but may also provide an indication of the distance that the second party has to travel before reaching the first party's residence. In those situations where the first vehicle 1010 is still en route to the first party's residence, follow me device 220 may provide not only the route that the second party is to follow, but may also provide an indication 1060 of the distance that the second party is behind the first party, as shown in FIG. 10I. Indication 1060 may include a message that specifies the distance, such as "YOU ARE 1.2 MILES BEHIND BOBSMITH."

Figure 10J:
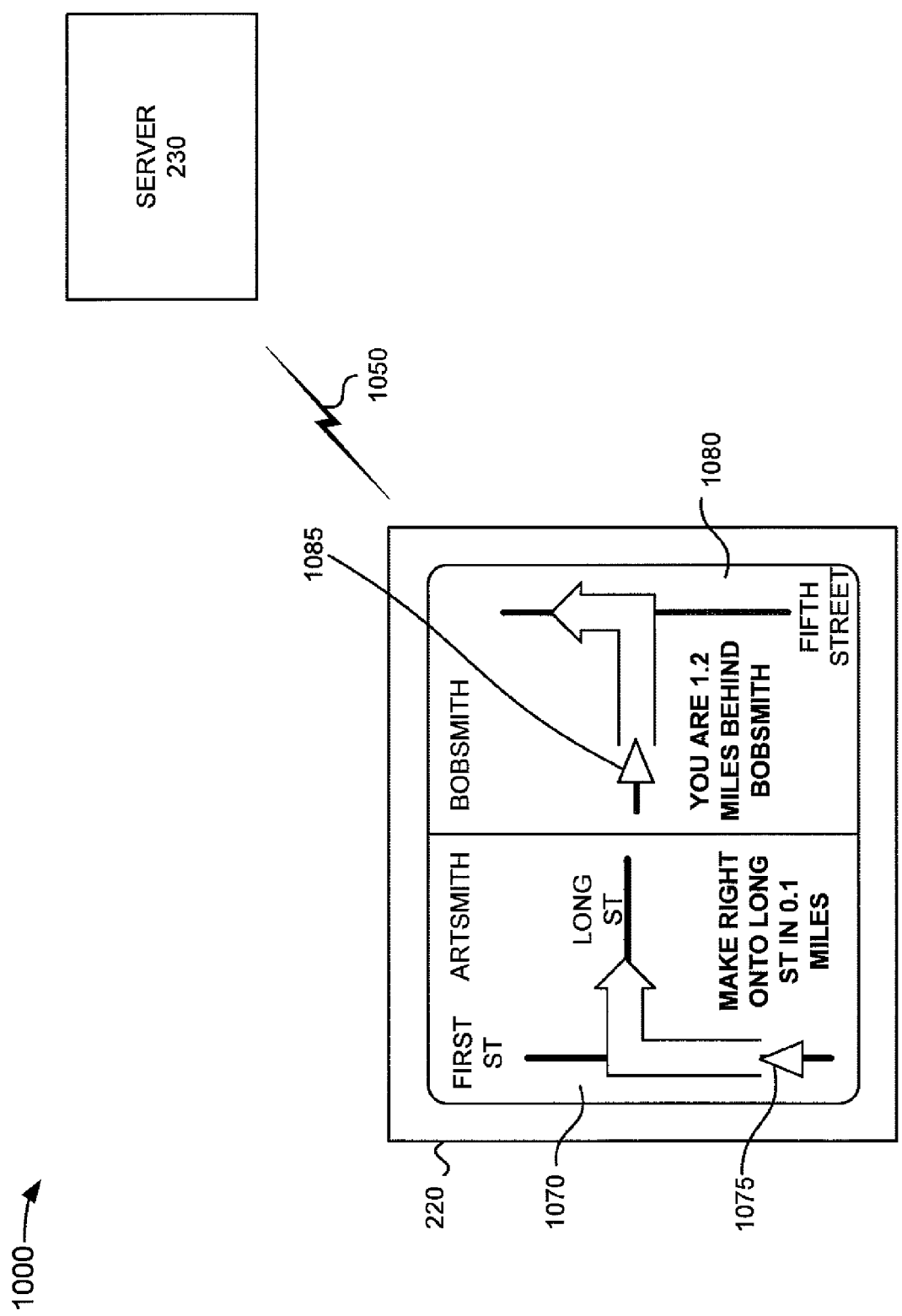

Additionally, or alternatively, follow me device 220 may not only provide follow me device 220's current location, but may also provide direction recording device 210's current location, as illustrated in FIG. 10J. Thus, as illustrated in FIG. 10J, follow me device 220 may cause a split screen to be provided to the second party. The split screen may include a first window 1070 and a second window 1080. As shown in FIG. 10J, first window 1070 may include an item 1075 that corresponds to the current location of follow me device 220, and second window 1080 may include an item 1085 that corresponds to the current location of direction recording device 210.

Figure 10K:
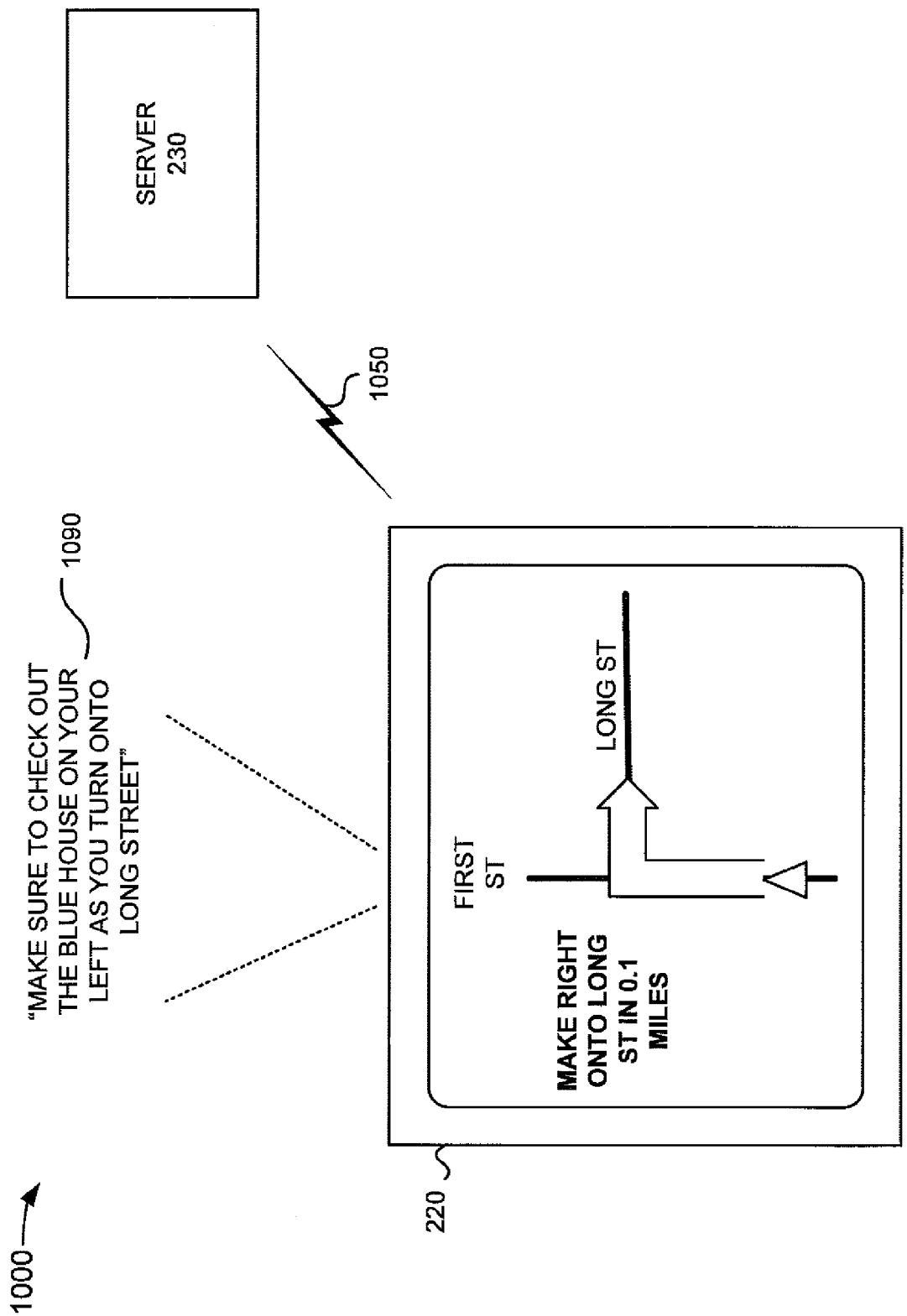

With reference to FIG. 10K, follow me device 220 may cause one or more annotations, which were recorded by the first party, to be provided to the second party. For example, assume that direction recording device 210 recorded a voice message 1090 as the first party turned onto Long Street on the way to the first party's residence. Direction recording device 210 may transmit, to server 230, recorded voice message 1090 in association with the location of direction recording device 210 at the time of the recording of voice message 1090 (e.g., as part of direction information 1030). Server 230 may provide voice message 1090 (e.g., as part of direction information 1050) to follow me device 220. Follow me device 220 may provide voice message 1090 to the second party at, for example, the time that follow me device 220 approaches (e.g., reaches, is at, within a particular distance from, etc.) the location at which voice message 1090 was recorded.

In some implementations, direction recording device 210 and follow me device 220 may physically be located within a single device. In these implementations, the single device may provide an interface that allows two (or possibly more) parties to track each other (e.g., the routes being traveled, the speed at which the parties are traveling, the distance between the parties, etc.) via a single device (regardless of the routes traveled by the two parties). In other implementations, a device may function as direction recording device 210 and follow me device 220 based on a position of the device. For example, when a user of the device is following a different user of another device, the device may function as a follow me device 220 and the other device may function as a direction recording device 210. Alternatively, when the user of the device is leading the different user of the other device, the device may function as a direction recording device 210 and the other device may function as a follow me device 220.

Also, a user may track direction information for a particular route using the single device during a first day, store the direction information at server 230, and cause a current trip along the route to be simultaneously provided to the user along with the previous day's direction information (e.g., in a single interface or in two different interfaces, such as a split screen interface similar to that shown in FIG. 10J).

FIGS. 11A-11E illustrate an example 1100 of recording and providing personalized directions. Assume that a first party, associated with a first vehicle 1110, lives in a town that is frequently visited by acquaintances of the first party. As show in FIG. 11A, assume that the town includes an airport, a historical building, a lake, an outdoor market, and a hotel. Further assume that the first party usually provides personal tours from the airport to the hotel. However, assume that the first party wants to allow acquaintances to take the same tour on their own even when the first party is unavailable to provide the tour. Assume that first vehicle 1110 includes direction recording device 210.

At the airport, the first party may cause direction recording device 210 to start recording direction information for the tour. Assume that the first party drives first vehicle 1110 on a route, from the airport to the hotel, via a location 1112, a location 1114, a location 1116, and a location 1118. Further assume that at location 1112 the user records a first voice message, such as "my favorite historical building is up ahead on the left," that at location 1114 the user records a second voice message, such as "Jim and I always swam in that lake on the left," that at location 1116 the user records a third voice message, such as "the outdoor market on the left is a great place to buy souvenirs," and that at location 1118 the user records a fourth voice message, such as "don't miss turn. Once you turn, you'll see the hotel."

Based on the route driven by first vehicle 1110 from the airport to the hotel, direction recording device 210 may record location information associated with the route. Direction recording device 210 may further capture the first voice message, the second voice message, the third voice message, and the fourth message, and may associate the voice messages with locations 1110, 1112, 1114, 1116, and 1118, respectively, that are on the route.

Figure 11A:
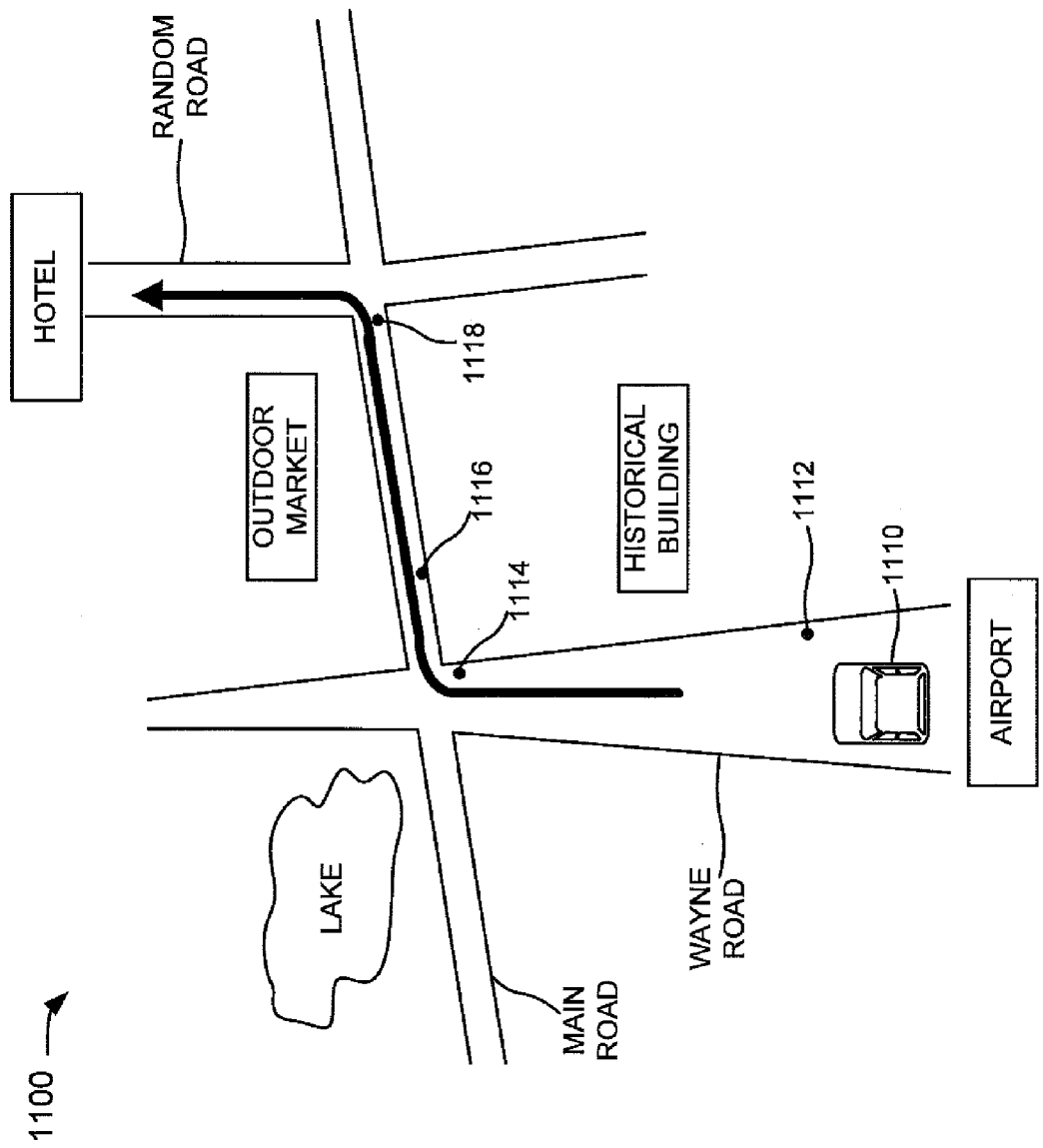
Figure 11B:
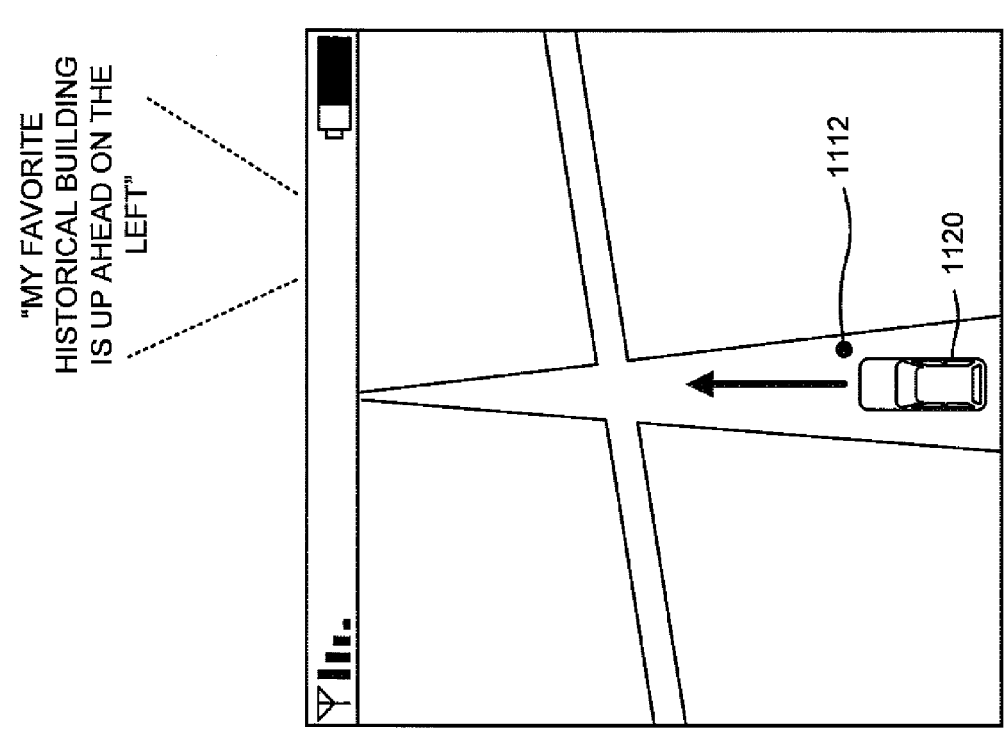

At the hotel, assume that the first party terminates the recording of the direction information, and commands direction recording device 210 to create a file based on the recorded direction information. Direction recording device 210 may create the file, which includes the location information and the voice messages from the recorded direction information. With reference to FIG. 11B, assume that a second party, associated with a second vehicle 1120, is planning to visit the town of the first party, and that the first party is unable to provide a personal tour to the second party. Assume that second vehicle 1120 includes follow me device 220. Moreover, assume that the first party prompts direction recording device 210 to transmit (e.g., via email or server 230) the file to follow me device 220 or that the second party uses follow me device 220 to retrieve/access the file directly from server 230.

Assume that the second party uses follow me device 220 to open the file. As shown in FIGS. 11B-11E, follow me device 220 may display a user interface 1105 to the second party. Follow me device 210 may provide the location information via user interface 1105. User interface 1105 may include an item that corresponds to second vehicle 1120.

Figure 11D:
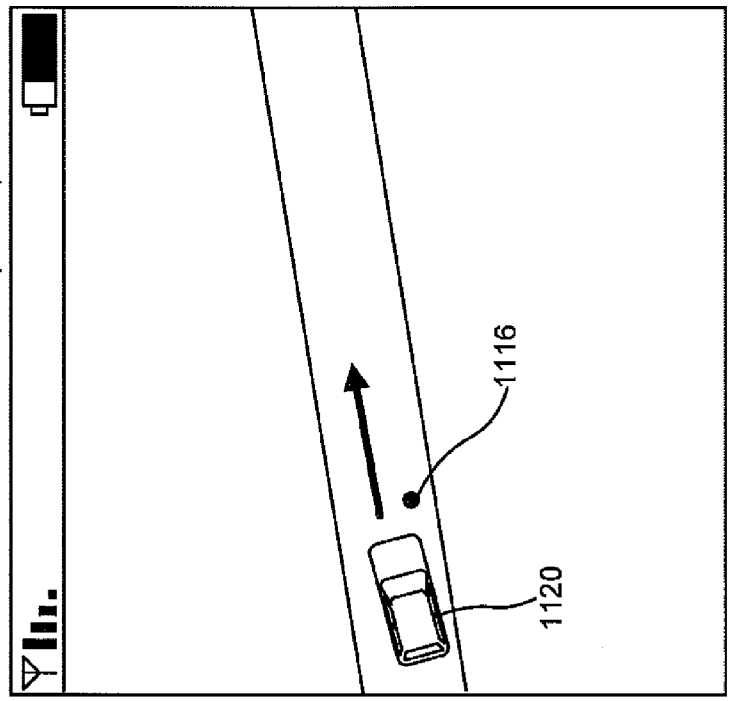
Figure 11E:
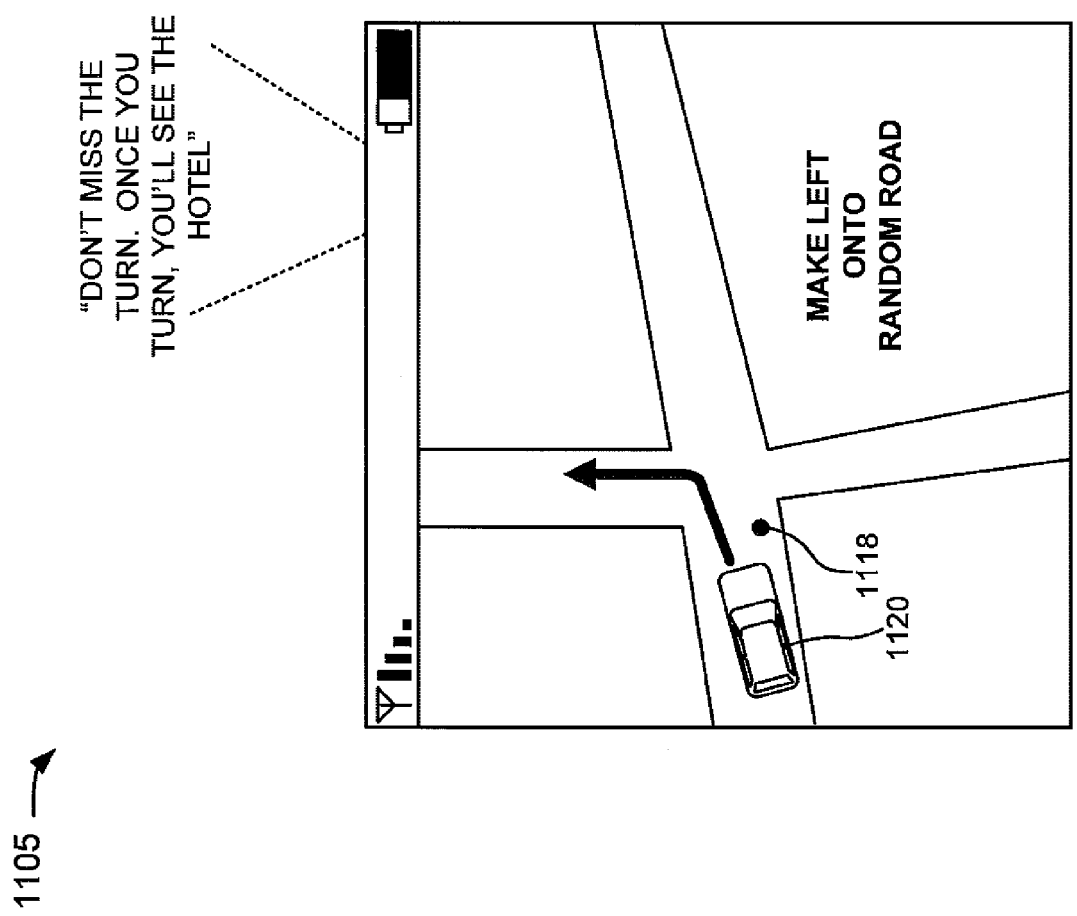

As shown in FIG. 11B, when second vehicle 1120 approaches location 1112, follow me device 220 may play the first voice message. As shown in FIG. 11C, when second vehicle 1120 approaches location 1114, follow me device 220 may display driving directions associated with location 1114 (e.g., "MAKE RIGHT ONTO MAIN ROAD"), and may play the second voice message. As shown in FIG. 11D, when second vehicle 1120 approaches location 1116, follow me device 220 may play the third voice message. As shown in FIG. 11E, when second vehicle 1120 approaches location 1118, follow me device 220 may display driving directions associated with location 1118 (e.g., "MAKE LEFT ONTO RANDOM ROAD"), and may play the fourth voice message. In some implementations, follow me device 220 may play audio to provide driving directions instead of, or in addition to, displaying the driving directions.

The foregoing description provides illustration and description, but is not intended to be exhaustive or to limit the implementations to the precise form disclosed. Modifications and variations are possible in light of the above teachings or may be acquired from practice of the implementations.

While series of blocks have been described with regard to FIGS. 8 and 9 the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosures of the implementations include each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
providing, by a first navigation device and to a second navigation device, a request to provide direction information to the second navigation device;
recording, by the first navigation device, the direction information as the first navigation device traverses a route from a first location to a second location, recording the direction information comprising:
  recording location information associated with the first navigation device,
  recording messages provided by a first user of the first navigation device, and
  creating the direction information based on the location information and the messages; and
transmitting, by the first navigation device and after a second user of the second navigation device accepts the request, the direction information to the second navigation device while the second navigation device is following the first navigation device along the route,
the direction information comprising:
  information that allows the second navigation device to follow the route traversed by the first navigation device, and
  the direction information being recorded by the first navigation device while the direction information is being transmitted to the second navigation device.

2. The method of claim 1,
where a first message, of the messages, is associated with a particular location of the route, and
where the direction information prompts the second navigation device to play the first message when the second navigation device is located at the particular location.

3. The method of claim 1, where the location information comprises information associated with at least one path and a distance traveled by the first navigation device along a highway or a street.

4. The method of claim 1, where the messages comprise at least one of audio messages, textual messages, images, or videos.

5. The method of claim 1, where providing the request comprises:
providing an interface to a user of the first navigation device; and
receiving an identifier of the second navigation device via the interface; and
providing the request based on the identifier.

6. The method of claim 1, further comprising:
receiving, from a user of the first navigation device, a command to terminate the recording of the direction information; and
terminating the recording of the direction information based on the command.

7. The method of claim 6, further comprising:
determining, based on the command, that the recording of the direction information has been terminated; and
transmitting, to the second navigation device, a signal that indicates that the recording of the direction information has been terminated.

8. The method of claim 6, where the first navigation device comprises at least one of a computer device or a mobile device.

9. A first navigation device comprising:
a processor to:
  provide, to a second navigation device, a request to provide first direction information to the second navigation device;
  record location information associated with the first navigation device,
  record messages provided by a user of the first navigation device, and
  create the first direction information based on the location information and the messages,
  transmit, after a second user of the second navigation device accepts the request, the first direction information to the second navigation device while the second navigation device is following the first navigation device along the route,
  record, after recording the first direction information and while transmitting the first direction information, second direction information as the first navigation device traverses the route from the second location to a third location, and
  transmit the second direction information to the second navigation device,
    the first direction information and the second direction information comprising information that allows the second navigation device to follow the route traversed by the first navigation device.

10. The first navigation device of claim 9, where the request includes an identifier of the second navigation device.

11. The first navigation device of claim 9, where, when transmitting the first direction information to the second navigation device, the processor is to:
transmit the first direction information to a server that forwards the first direction information to the second navigation device.

12. The first navigation device of claim 9, where the processor is further to:
determine whether the recording of the second direction information has been terminated, and
transmit, to the second navigation device, a signal that indicates that the recording of the second direction information has been terminated when the recording of the second direction information has been terminated.

13. The first navigation device of claim 12, where, when determining whether the recording of the second direction information has been terminated, the processor is to:
determine that the recording of the second direction information has been terminated when a user of the first navigation device commands the first navigation device to terminate the recording of the second direction information or to turn off the first navigation device.

14. The first navigation device of claim 9, where the first direction information and the second direction information comprise:
identifiers of one or more paths traveled by the first navigation device while traversing the route, and
one or more distances traveled by the first navigation device along each of the one or more paths.

15. The first navigation device of claim 14, where the first direction information and the second direction information further comprise at least two of:
an audio message associated with a first location of the route,
a text message associated with a second location of the route, or
a speed of the first navigation device at the first location or the second location.

16. The first navigation device of claim 9, where the first direction information prompts the second navigation device to provide, for output, one or more of the messages when the second navigation device is located at one or more particular locations traversed by the first navigation device along the route.

17. A non-transitory computer-readable medium storing instructions, the instructions comprising:
one or more instructions that, when executed by one or more processors of a first device, cause the one or more processors to:
  provide, to a second device, a request to receive direction information from the second device;

determine a first location of the first device while the first device is following a second device along a route, receive, after the second device accepts the request, the direction information from the second device while the first device is following the second device along the route, the direction information comprising a second location of the second device, determine the route based on the first location and the direction information, provide, for display, driving directions for the first device based on the route, the driving directions including information directing the first device to the second location, provide, for display, a first item that corresponds to the first device at the first location, and provide, for display and while providing the driving directions and the first item, a second item that corresponds to the second device at the second location.

18. The non-transitory computer-readable medium of claim 17, the instructions further comprising:

one or more instructions that, when executed by the one or more processors of the first device, cause the one or more processors to:

determine a third location of the first device, receive additional direction information from the second device, the additional direction information comprising a fourth location of the second device, determine the route, for the first device, based on the second location, the third location, and the fourth location, and provide, for display, new driving directions for the first device based on the route, the new driving directions including information directing the first device to the fourth location via the second location.

19. The non-transitory computer-readable medium of claim 17, the instructions further comprising:

one or more instructions that, when executed by the one or more processors of the first device, cause the one or more processors to:

determine a distance between the first device and the second device based on the first location and the second location, and provide, for display, information that specifies the determined distance.

20. The non-transitory computer-readable medium of claim 17, where the direction information further comprises a voice message recorded by the user of the second device at the second location, and where the instructions further comprise:

one or more instructions that, when executed by the one or more processors of the first device, cause the one or more processors to:

provide, for output, the voice message when the first device is at the second location.

* * * * *